(12) United States Patent
Sugihara et al.

(10) Patent No.: US 8,450,873 B2
(45) Date of Patent: May 28, 2013

(54) AV SYSTEM, POWER FEEDING APPARATUS AND POWER RECEIVING APPARATUS

(75) Inventors: Shogo Sugihara, Neyagawa (JP); Koji Harada, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 531 days.

(21) Appl. No.: 12/728,376

(22) Filed: Mar. 22, 2010

(65) Prior Publication Data
US 2010/0321588 A1 Dec. 23, 2010

(30) Foreign Application Priority Data
Jun. 18, 2009 (JP) .................................. 2009-145792

(51) Int. Cl.
*H02J 1/00* (2006.01)
(52) U.S. Cl.
USPC .......................................................... 307/31
(58) Field of Classification Search
USPC .......................................................... 307/31
See application file for complete search history.

(56) References Cited

U.S. PATENT DOCUMENTS

| | | | | | |
|---|---|---|---|---|---|
| 5,349,477 | A | * | 9/1994 | Shuto ............................... | 360/15 |
| 6,594,161 | B2 | * | 7/2003 | Jansen et al. ................ | 363/21.14 |
| 6,671,189 | B2 | * | 12/2003 | Jansen et al. ................ | 363/21.14 |
| 7,260,657 | B2 | * | 8/2007 | Matsumoto et al. ............ | 710/52 |
| 2004/0083311 | A1 | * | 4/2004 | Zhuge et al. ...................... | 710/1 |
| 2006/0100799 | A1 | | 5/2006 | Karam | |
| 2007/0025240 | A1 | | 2/2007 | Snide | |
| 2007/0028127 | A1 | | 2/2007 | Kim | |

(Continued)

FOREIGN PATENT DOCUMENTS

JP 05-046543 2/1993

(Continued)

OTHER PUBLICATIONS

"ATX12V Power Supply Design Guide Version 2.2", Mar. 31, 2005, XP55008542, Retrieved from the Internet: URL:http://www.formfactors.org/developer/specs/ATX12V_PSDG_2_2_public_br2.pdf [retrieved on Sep. 30, 2011].

(Continued)

*Primary Examiner* — Adi Amrany
(74) *Attorney, Agent, or Firm* — Renner, Otto, Boisselle & Sklar, LLP

(57) ABSTRACT

An AV system in which a power feeding apparatus and a plurality of power receiving apparatuses are connected in a daisy chain with the power feeding apparatus in the lead, wherein the power feeding apparatus includes: a connection detecting line; an applying unit for applying a voltage to the connection detecting line; and a power supply unit for supplying a power to the power receiving apparatus or suspends the supply of the power according to a voltage level of the connection detecting line, the power receiving apparatuses include: a contents signal output unit for outputting a contents signal upon the supply of the power; a ground terminal having a ground potential; a conducting line connectable to the ground terminal in another power receiving apparatus adjacent on the rear; and a first switch unit for enabling the connection detecting line to be connected to any one of the ground terminal and the conducting line and holding a connected state even when the power is not supplied.

20 Claims, 14 Drawing Sheets

U.S. PATENT DOCUMENTS

2008/0052417 A1* 2/2008 Aoyama et al. .................. 710/1
2009/0150589 A1   6/2009 Watarai et al.
2011/0185093 A1*  7/2011 Matsuo et al. ................ 710/110
2011/0208886 A1*  8/2011 Sugiura et al. ............... 710/110

FOREIGN PATENT DOCUMENTS

| | | |
|---|---|---|
| JP | 05-094411 | 4/1993 |
| JP | 06-266480 | 9/1994 |
| JP | 2000-217151 | 8/2000 |
| JP | 4258569 | 2/2009 |
| JP | 2009-118184 | 5/2009 |
| WO | 98/52117 | 11/1998 |

OTHER PUBLICATIONS

Anonymous: "How do I manually turn on an ATX power supply? A", May 24, 2004, XP55008549, Retrieved from the Internet; URL:http://www.techpowerup.com/articles/other/22 [retrieved on Sep. 30, 2011].

"USB Serial Bus Specification Revision 2.0" (Online) Apr. 27, 2000, pp. 15-24, 119-194, XP002623286.

* cited by examiner

FIG. 8  PROCESS OF OPTION UNIT OPFn

AV SYSTEM, POWER FEEDING APPARATUS AND POWER RECEIVING APPARATUS

BACKGROUND OF THE INVENTION

1. Field of the Invention

The present invention relates to an AV (Audio Visual) system. More specifically, the invention relates to the AV system having a power feeding apparatus for feeding a power and a power receiving apparatus connected to the power feeding apparatus for outputting a contents signal upon supply of the power from the power feeding apparatus.

2. Description of the Related Art

Recently, option units that reinforce the function of AV apparatuses such as AV amplifiers and AV receivers appear on the market. The option units are modules that are externally attached to the AV apparatuses via connectors. Examples of the option units are cradles to which digital audio players (DAP) are detachable and TV tuner apparatuses, radio tuner apparatuses, DVD player apparatuses, CD player apparatuses, and HDD players.

As a method for connecting a plurality of option units to an AV apparatus, daisy chain connection is considered. In the daisy chain connection, as shown in FIG. 1, an AV apparatus 100 and a plurality of option units OPC1 to OPCn (n: natural number) are connected in series with the AV apparatus 100 in the lead. The option unit OPCn is connected to an apparatus before or after itself (the AV apparatus 100 or another option unit OPCn) via a connector. The option units OPC1 to OPCn receive supply of a power from the AV apparatus 100 so as to be capable of operating. That is to say, the AV apparatus 100 serves as a power feeding apparatus, and the option units OPC1 to OPCn serve as power receiving apparatuses.

When the daisy chain connection shown in FIG. 1 is performed, the AV apparatus 100 communicates with the option unit OPCn to be controlled in the plurality of option units OPC1 to OPCn so as to control it. For example, when a cradle to which DAP is attached is connected as the option unit, the AV apparatus 100 makes controls such as selection, reproduction and suspension of contents in DAP via the cradle.

When an AV system adopts such daisy chain connection and a power is always supplied to an option unit, power consumption increases. In order to repress the power consumption, it is preferable that while the operation of the option unit suspends, the supply of the power is repressed. However, even in a case where the power is not supplied, when a new option unit to be controlled is selected or connected, the AV apparatus should detect the option unit to be controlled so as to supply a power thereto.

Japanese Patent Application Laid-Open No. 5-46543 discloses a technology that detects connection of a new option unit while repressing power consumption in a circuit adopting the daisy chain connection system. In the technology disclosed in this document, however, as shown in FIG. 1, option units are not connected in series via a connector.

SUMMARY OF THE INVENTION

It is an object of the present invention to provide an AV system that is capable of supplying a power to a power receiving apparatus to be controlled while power consumption of the power receiving apparatus daisy-chain-connected to a power feeding apparatus is being repressed.

According to a preferred embodiment of the present invention, an AV system in which a power feeding apparatus and a plurality of power receiving apparatuses are connected in a daisy chain with the power feeding apparatus in the lead, wherein the power feeding apparatus includes: a connection detecting line; an applying unit for applying a voltage to the connection detecting line; and a power supply unit for supplying a power to the power receiving apparatus or suspends the supply of the power according to a voltage level of the connection detecting line, the power receiving apparatuses include: a contents signal output unit for outputting a contents signal upon the supply of the power; a ground terminal having a ground potential; a conducting line connectable to the ground terminal in another power receiving apparatus adjacent on the rear; and a first switch unit for enabling the connection detecting line to be connected to any one of the ground terminal and the conducting line and holding a connected state even when the power is not supplied.

In the AV system according to the present invention, when a power receiving apparatus to be controlled is not connected, a first switch unit does not connect a ground terminal to a connection detecting line. When the power receiving apparatus to be control is connected, the first switch unit connects the ground terminal in the power receiving apparatus with the connection detecting line. For this reason, a voltage level of the connection detecting line changes between the cases where the power receiving apparatus to be controlled is connected and is not connected. Therefore, the power feeding apparatus can control the supply of a power according to the voltage level of the connection detecting line. That is to say, when the power receiving apparatus to be controlled is not connected, the supply of the power is suspended, and the connection of the power receiving apparatus to be controlled is detected, so that the power can be supplied.

Preferably, the power receiving apparatuses further include a second switch unit for switching a supply destination of the power between the contents signal output unit and another power receiving apparatus adjacent on the rear according to a connecting destination of the connection detecting line by the first switch unit.

In this case, power consumption can be further reduced.

Preferably, the power receiving apparatuses further include: a switch detecting unit connected to the first switch unit in which a voltage level fluctuates according to the connecting destination of the connection detecting line, the second switch unit switches the supply destination of the power according to the voltage level of the switch detecting unit.

In this case, the connected state of the first switch unit can be easily detected.

Preferably, the power receiving apparatuses further include an interruption unit for, when the first switch unit switches the connecting destination of the connection detecting line, interrupting the connection between the connection detecting line and the first switch unit, after the second switch unit switches the supply destination of the power, canceling the interruption of the connection between the connection detecting line and the first switch unit, the contents signal output unit further outputs type information about a type of the contents signal output unit according to a request from the power feeding apparatus when the power is supplied, the power feeding apparatus further includes: a request unit for requesting the contents signal output unit to which the power is supplied to send the type information according to a change in the voltage level of the connection detecting line; and a control unit for controlling the contents signal output unit based on the type information.

When the power is supplied to the plurality of power feeding apparatuses that is daisy-chain-connected, the AV apparatus cannot detect the switching of the apparatus to be controlled. Therefore, when the apparatus to be controlled is switched, the interruption circuit temporarily interrupts the connection detecting line, and creates an unconnected state in a pseudo manner. As a result, the power feeding apparatus can detect a fluctuation in the voltage level of the connection detecting line, and can acquire type information about the contents signal output unit in the power receiving apparatus to be controlled at the detection timing. For this reason, the power feeding apparatus can make control according to the switched apparatus to be controlled.

Preferably, when the voltage level of the connection detecting line is changed from an H level into an L level and even though a predetermined period longer than time required for the interruption unit to interrupt the connection between the connection detecting line and the first switch unit and to cancel the interruption passes, the voltage level is maintained in the L level, the power supply unit suspends the supply of the power.

In this case, when the unconnected state is created in a pseudo manner as described above, the interruption of the supply of the power to the feeding apparatus to be controlled can be repressed.

Preferably, when the power is supplied to the power receiving apparatuses, the first switch unit switches a connecting destination of the connection detecting line according to an acknowledgment of specification output from the power feeding apparatus, the power receiving apparatuses further include: a second switch unit for switching a supply destination of the power between the contents signal output unit and another receiving apparatus adjacent on the rear according to the acknowledgement of the specification, the power feeding apparatus includes: a specification receiving unit for accepting specification of a power receiving apparatus to be controlled in the plurality of power receiving apparatuses; and a specification acknowledging unit for outputting the acknowledgement of the specification including an identification number of the specified power receiving apparatus to the power receiving apparatus.

In this case, the power feeding apparatus can specify the power feeding apparatus to be controlled, and a power can be supplied to the power feeding apparatus to be controlled.

Preferably, the power feeding apparatus further includes a first identification number acknowledging unit for acknowledging an identification number of the power receiving apparatus adjacent on the rear when the power is supplied, the power receiving apparatus further include: a registering unit for registering the identification number acknowledged from the power feeding apparatus adjacent on the front or the power receiving apparatus as a self identification number; and a second identification number acknowledging unit for creating the identification number of the power receiving apparatus adjacent on the rear based on the self identification number so as to acknowledge the created identification number.

In this case, an identification number of the power receiving apparatus can be dynamically set.

Preferably, the power receiving apparatuses further include a determining unit for determining whether the specified power receiving apparatus is itself or another receiving apparatus connected to a subsequent stage of the self apparatus based on the self identification number and the identification number included in the acknowledgment of the specification, when the specified power receiving apparatus is the self apparatus, the first switch unit connects the connection detecting line to the ground terminal, and the second switch unit sets the contents signal output unit as the supply destination of the power, when the specified power receiving apparatus is another power receiving apparatus connected to the subsequent stage of the self apparatus, the first switch unit connects the connection detecting line to the conducting line and the second switch unit sets another power receiving apparatus adjacent on the rear as the supply destination of the power, and the second identification number acknowledging unit acknowledges the identification number.

In this case, a process according to the connected relationship between the specified power receiving apparatus and the self apparatus can be executed based on the identification number.

Preferably, the power receiving apparatuses further include: an activation completion acknowledging unit for, when the specified power receiving apparatus is the self apparatus, transmitting an acknowledgment of activation completion after the operations of the first and second switch units are completed; and a type information transmitting unit for transmitting type information about a type of the contents signal output unit to the power feeding apparatus according to a request of the type information from the power feeding apparatus, the power feeding apparatus further includes: a type information request unit for requesting the specified power receiving apparatus to transmit the type information according to the acknowledgment of the activation completion; and a control unit for controlling the contents signal output unit of the specified power receiving apparatus according to the transmitted type information.

In this case, the power feeding apparatus can check that activation of a new power receiving apparatus to be controlled is completed according to the acknowledgment of activation completion.

The power feeding apparatus and the power receiving apparatus according to the present invention are used in the above AV system.

DETAILED DESCRIPTION OF THE PREFERRED EMBODIMENTS

Figure 1:
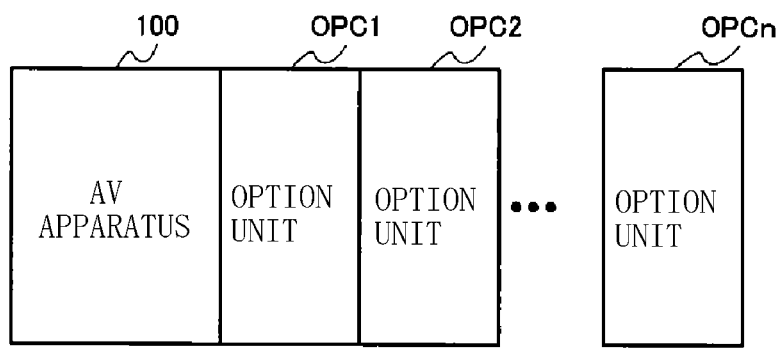
FIG. 1 is a block diagram illustrating an entire constitution of a prior art AV system to which an AV apparatus and option units are connected in a daisy chain.

Embodiments of the present invention are described in detail below with reference to the drawings. Like portions are designated by like reference numbers in the drawings, and description thereof is not repeated.

First Embodiment

Entire Constitution

Figure 2:
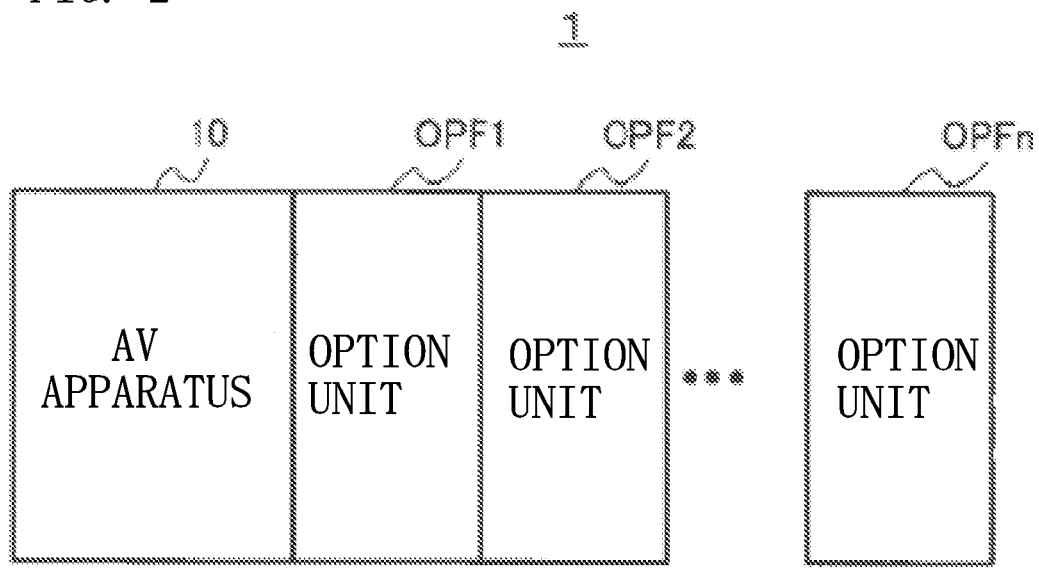
FIG. 2 is a diagram illustrating the entire constitution of the AV system according to a first embodiment of the present invention.

With reference to FIG. 2, an AV system 1 according to the first embodiment of the present invention has an AV apparatus 10, and option units OPF1 to OPFn (n: natural number). Hereinafter, "the option unit" is simply described as "the unit". The AV apparatus 10 and a plurality of units OPFn are connected in a daisy chain with the AV apparatus 10 in the lead. The AV apparatus 10 and the units OPFn are connected to adjacent units in series via connectors.

The AV apparatus 10 corresponds to a master apparatus in the daisy chain connection, and serves as a power feeding apparatus that supplies a power to the units OPFn as slave apparatuses. In the first embodiment, the AV apparatus 10 is an AV amplifier. The AV apparatus 10 may be AV apparatuses other than the AV amplifier (for example, an AV receiver, a DVD player, a CD player, an HDD player, a tuner apparatus). The units OPFn operate upon the supply of the power from the AV apparatus 10. That is to say, the units OPFn serve as power receiving apparatuses.

[Constitution of the AV Apparatus]

Figure 3:
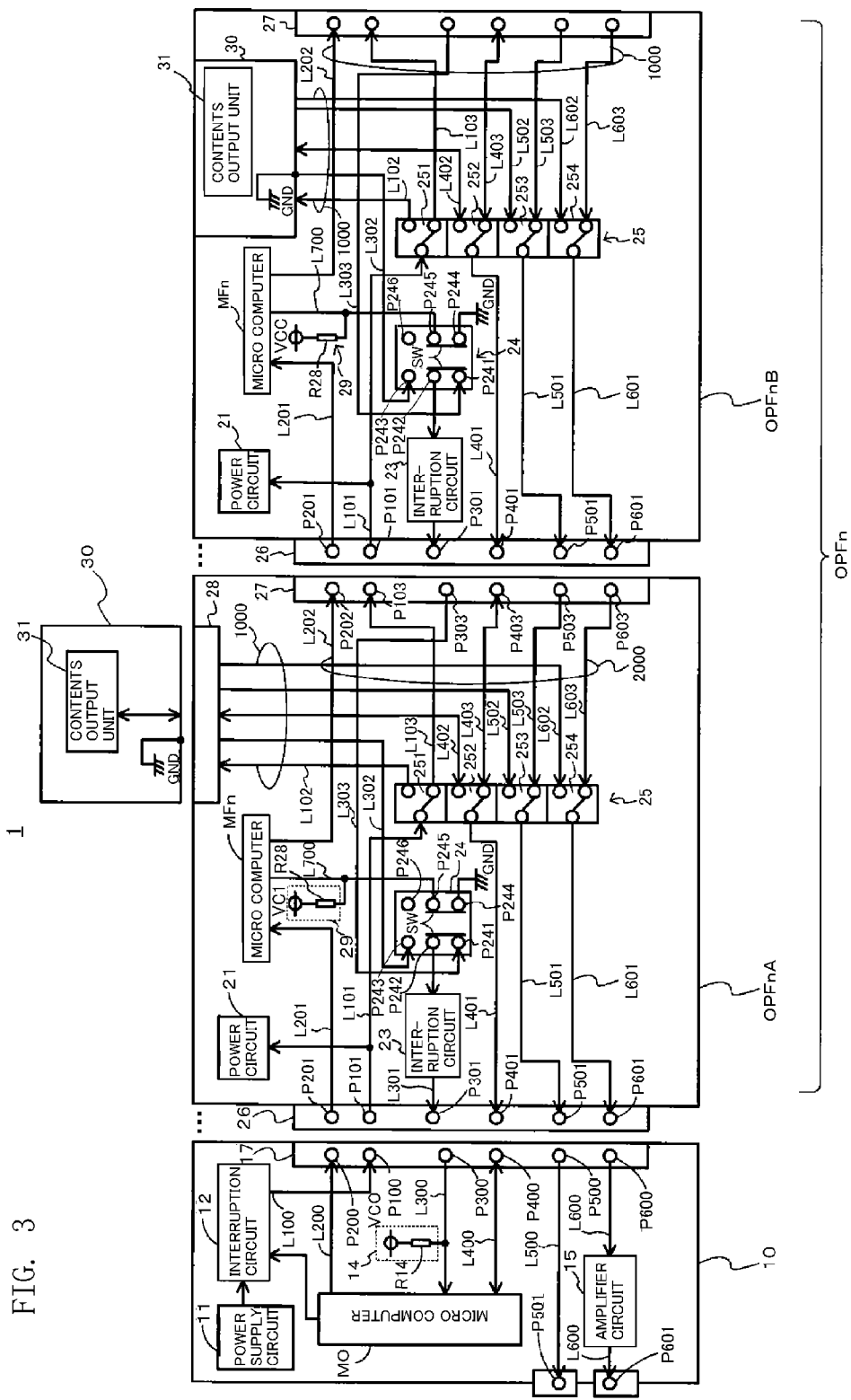
FIG. 3 is a functional block diagram illustrating constitutions of the AV apparatus and the option units in FIG. 2.

With reference to FIG. 3, the AV apparatus 10 has a power supply circuit 11, an interruption circuit 12, a microcomputer M0, a pull-up circuit 14, an amplifier circuit 15, and a connector 17.

[Power Supply Circuit]

The power supply circuit 11 supplies a power to the units OPFn. The power supply circuit 11 is connected to a power supply line L100. When the units OPFn are connected in the daisy chain, the power is supplied to the units OPFn via the power supply line L100.

[Interruption Circuit]

The interruption circuit 12 is an electric switch, such as a relay switch, that is connected between the power supply circuit 11 and the power supply line L100. In this example, the relay switch is described as the interruption circuit 12. The relay switch normally receives an interruption signal of L level from the microcomputer M0, and is in an OFF state, and disconnects the power supply circuit 11 and the power supply line L100. When receiving an interruption signal of H level from the microcomputer M0, the relay switch is in an ON state so as to connect the power supply circuit 11 and the power supply line L100.

[Microcomputer]

With reference to FIG. 3, the microcomputer M0 controls the entire AV apparatus 10. The microcomputer M0 is connected to a reset signal line L200, a connection detecting line L300, and a communication line L400.

(A) Relationship Between the Microcomputer and the Reset Signal Line

The microcomputer M0 outputs a reset signal to a unit OPF1 adjacent on the rear (see FIG. 2) via the reset signal line L200. When the microcomputer M0 activates the unit OPF1 adjacent on the rear, it supplies a power and activates a reset signal into an H level.

(B) Relationship Between the Microcomputer and the Connection Detecting Line

The microcomputer M0 detects whether the unit OPFn to be controlled is connected according to the voltage level of the connection detecting line L300.

(C) Relationship Between the Microcomputer and the Communication Line L400

The microcomputer M0 further controls the unit OPFn to be controlled using the communication line L400. The microcomputer M0 makes communication control according to a type of the unit OPFn. The communication using the communication line L400 is, for example, UART communication.

The microcomputer M0 contains a memory, not shown, and the memory stores control communication commands according to types of the units OPFn (for example, types of DAP to be attached to the cradle and tuner apparatus, etc.) therein. When the unit OPFn to be controlled is changed, the microcomputer M0 requests the unit OPFn to be controlled to transmit information representing the type of the unit (hereinafter, type information) via the communication line L400. The unit OPFn to be controlled receives the request and outputs the type information to the communication line L400. The microcomputer M0 makes the communication control according to the type information.

[Pull-Up Circuit]

The pull-up circuit 14 is connected to the connection detecting line L300. The pull-up circuit 14 has a power potential node VC0, and a resistive element R14 that is connected between the power potential node VC0 and the connection detecting line L300. The pull-up circuit 14 applies a voltage to the connection detecting line L300, and pulls up it to a predetermined voltage (power potential VC0). When the unit OPFn to be controlled is not connected to the AV apparatus 10, one end of the connection detecting line (connector 17 side) becomes an open end. For this reason, the voltage level of the connection detecting line L300 becomes an H level (high-impedance state). On the other hand, when the unit OPFn to be controlled is connected to the AV apparatus 10, the voltage level of the connection detecting line L300 becomes an L level as described later. The microcomputer M0 can check the connection/disconnection of the unit OPFn to be controlled based on the voltage level of the connection detecting line L300.

[Another Constitution]

The AV apparatus 10 further has a video signal line L500, a sound signal line L600, and the amplifier circuit 15. The video signal line L500 receives a video signal transmitted from the unit OPFn that outputs the video signal (for example, a DVD player or an HDD player, etc.) via the connector 17, and outputs the video signal to the outside from a video output terminal P501. For example, a display apparatus or the like is connected to the video output terminal P501.

The amplifier circuit 15 receives a sound signal transmitted from a unit that outputs the sound signal (for example, a cradle to which DAP is attached, a DVD player, or an HDD player, etc.) via the sound signal line L600, and amplifies it. The amplifier 15 outputs the amplified sound signal to the outside from a sound output terminal P601. For example, a speaker is connected to the sound output terminal P601.

The AV apparatus 10 further has the connector 17 for connecting the unit OPn. The connector 17 includes the respective lines L100, L200, L300, L400, L500, and L600, and input/output terminals P100, P200, P300, P400, P500 and P600.

[Constitution of the Unit]

The units OPFn have two types. One of the types is a "detachable type" unit from which a contents apparatus as one enclosure housing a portion for outputting contents signals such as a video signal and a sound signal (hereinafter, a contents output unit) is detachable. The other one is a "fixed type" unit from which the contents output unit is not detachable. The detachable type unit OPFn is, for example, a cradle from which DAP is detachable. The fixed type unit OPFn is, for example, a tuner apparatus, a DVD player, or an HDD player. The constitutions of the "detachable type" and the "fixed type" are described below. In the following description, the detachable type unit is described as "OPFnA", and the fixed type unit is described as "OPFnB" particularly for discrimination. When the discrimination between the detachable type and the fixed type is not necessary, simply the unit OPFn is described. That is to say, when "the unit OPFn" is described, it corresponds to both the detachable type unit and the fixed type unit.

[Constitution of the Detachable Type Unit]

With reference to FIG. 3, the detachable type unit OPFnA has a power circuit 21, a microcomputer MFn, an interruption circuit 23, a slide switch 24, a function switch 25, connectors 26 to 28, a pull-up circuit 29, power receiving lines L101 to L103, and conducting lines L301 to L303.

A contents apparatus 30 represented by a digital audio player apparatus (DAP) can be attached/detached to/from the unit OPFn(1) via the connector 28.

[Contents Apparatus]

The contents apparatus 30 is one enclosure that houses a contents signal output unit 31 and a ground terminal GND having a ground potential. The contents signal output unit 31 outputs contents of a video signal and/or a sound signal, etc. For example, when the contents apparatus 30 is DAP, an audio file stored in a hard disc drive, not shown, is decoded so that an audio signal is output. When the contents apparatus 30 is a tuner circuit, airwaves are demodulated so that an audio signal and a sound signal are output.

[Front Connector]

The connector 26 includes input/output terminals P101, P201, P301, P401, P501 and P601 connected to one ends of the signal lines L101, L201, L301, L401, L501 and L601. When an apparatus connected to neighbor on the front to the unit OPFnA is the AV apparatus 10, the terminal P101 is connected to the terminal P100 in the connector 17. As a result, the power receiving line L101 is connected to the power supply line L100. Similarly, the terminal P201 is connected to the terminal P200. As a result, the reset signal lines L200 and L201 are connected. The terminal P301 is connected to the terminal P300. As a result, the conducting line L301 is connected to the connection detecting line L300. The terminal P401 is connected to the terminal P400, and the communication lines L400 and L401 are connected. The terminal P501 is connected to the terminal P500, and the terminal P601 is connected to the terminal P600.

[Power Circuit]

The power circuit 21 is connected to the power receiving line L101. The power circuit 21 receives a power supplied from the power supply circuit 11 via the power receiving line L101. The power circuit 21 generates a voltage for the unit OPFnA so as to supply it to respective main sections in the unit OPFnA.

[Pull-Up Circuit]

The pull-up circuit 29 is connected to a switch detecting line L700. The pull-up circuit 29 applies a predetermined voltage VC1 to the switch detecting line L700. The configuration of the pull-up circuit 29 is similar to that of the pull-up circuit 14, and has a power potential terminal VC1 and a resistive element R28. When the pull-up circuit 29 applies the voltage to the switch detecting line L700, the microcomputer MFn can recognize whether the unit OPFnA is in "a controlled object mode" or "a through mode".

[Slide Switch and Function Switch]

The state of the operating unit OPFn includes "the controlled object mode" and "the through mode". "The controlled object mode" is a state that the unit OPFn is operable as an object to be controlled. Further, "the through mode" is a state that a power is supplied to the option OPFn to be controlled on the subsequent stage of the self unit (namely, the power from the AV apparatus 10 is applied through to the subsequent stage). The slide switch 24 and the function switch 25 set the unit OPFn into the controlled object mode or the through mode according to a user's operation.

[Slide Switch]

The slide switch 24 is a so-called mechanical switch. The slide switch 24 mechanically opens and closes contacts P241 to P246. The slide switch 24 has an operating piece SW and the plurality of contacts P241 to P246. The contacts P241 to P243 are arranged in one line. The contact P242 is connected to the interruption circuit 23. The contact P241 is connected to the conducting line L303. The contact P243 is connected to the conducting line L302.

Contacts P244 to P246 are also arranged in one line. At this time, the contacts P244 and P241, the contacts P245 and P242, and the contacts P246 and P243 are provided adjacent to each other. The contact P244 is connected to the ground terminal GND having ground potential. The contact P245 is connected to the switch detecting line L700. The contact P246 is not connected to a signal line.

The operating piece SW is manually moved to an up-down direction in the drawing. The operating piece SW selectively connects the contacts P241 to P243 and the contacts P244 to P246.

A user manually operates the operating piece SW so as to switch a supply destination of the power and signals on the communication lines L400, L500 and L600. In other words, the user moves the operating piece SW so as to switch the state between "the controlled object mode" and "the through mode". When the operating piece SW is moved downward in the drawing, the slide switch 24 is set to "the through mode". At this time, the contacts P241 and P242 are connected. Further, the contacts P244 and P245 are connected. As a result, the connection detecting line L300 is connected to the conducting line L303. In this case, the unit OPFn on the subsequent stage of the unit OPFnA becomes an object to be controlled.

When "the through mode" is set, the contacts P244 and P245 in the slide switch 24 are connected. In this case, the switch detecting line L700 is connected to the ground terminal GND. For this reason, the voltage level of the switch detecting line L700 becomes L level.

On the other hand, when the operating piece SW is moved upward in the drawing, the slide switch 24 is set to "the controlled object mode". At this time, the contacts P242 and P243 are connected. At this time, the connection detecting line L300 is connected to the conducting line L302. The conducting line L302 can be connected to the ground terminal GND of the contents signal generating unit 30 via the connector 28. Further, when the operating piece SW is moved upward, the contacts P245 and P246 are connected. At this time, since one end of the switch detecting line L700 is opened, the voltage level becomes the H level (high-impedance state).

[Function Switch]

The function switch 25 is an electric switch that is turned ON/OFF in response to an instruction from the microcomputer MFn. The function switch 25 has a plurality of switch elements 251 to 254. The respective switch elements may adopt a contact system, or may adopt a non-contact system utilizing a transistor or the like. The switch element 251 switches a connecting destination of the power receiving line L101 between the power receiving line L102 and L103 in response to the instruction from the microcomputer MFn. The switch element 252 switches a connecting destination of the communication line L401 between the communication lines L402 and L403. The switch element 253 switches a connecting destination of the video signal line L501 between the video signal lines L502 and L503. The switch element 254 switches a connecting destination of the sound signal line L601 between the sound signal lines L602 and L603. Thereafter, the conducting lines L302, L102, L402, L502 and L602 are collectively referred as "self side signal line group 1000", and signal lines L202, L303, L103, L403, L503 and L603 are collectively referred as "through side signal line group 2000".

[Rear Connector]

The connector 27 has input/output terminals P202, P103, P303, P403, P503 and P603. The terminal P202 is connected to the reset signal line L202. The terminal P103 is connected to the power receiving line L103. The terminal P303 is connected to the conducting line L303. The terminal P403 is connected to the communication line L400. The terminal P503 is connected to the video signal line L503, and the terminal 603 is connected to the sound signal line L603 respectively.

The connector 27 is connected to the connector 26 of the unit OPFn adjacent on the rear. At this time, since the terminal P202 is connected to the terminal P201, the reset signal line L202 is connected to the reset signal line L201 of the unit OPFn adjacent on the rear. Since the terminal P103 is connected to the terminal P101, the power receiving line L103 is connected to the power receiving line L101 of the unit OPFn adjacent on the rear. Similarly, the terminal P303 is connected to the terminal P301, the terminal P403 is connected to the terminal P401, the terminal P503 is connected to the terminal P501, and the terminal P603 is connected to the terminal P601 respectively.

[Interruption Circuit]

Figure 4:
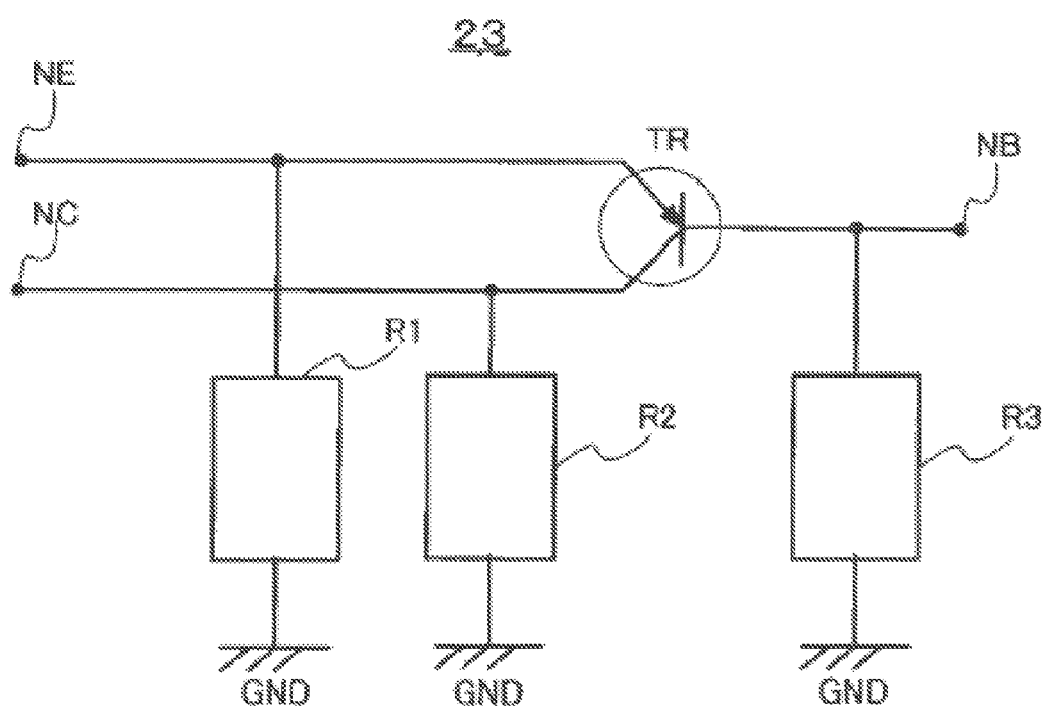
FIG. 4 is a circuit diagram illustrating an interruption circuit in FIG. 3.

The interruption circuit 23 is connected between the conducting line L301 and the slide switch 24. FIG. 4 is a circuit diagram illustrating the interruption circuit. The interruption circuit 12 has a PNP transistor TR and resistive elements R1 to R3. An emitter terminal NE of the PNP transistor TR is connected to the conducting line L301. A collector terminal NC is connected to the contact P242 of the slide switch 24. A base terminal NB is connected to the microcomputer MFn. The resistive element R1 is connected between the emitter terminal NE and the ground terminal GND, and the resistive element R2 is connected between the collector terminal NC and the ground terminal GND. The resistive element R3 is connected between the base terminal NB and the ground terminal GND.

When the unit OPFn is connected to the AV apparatus 10, the conducting line L301 is connected to the connection detecting line L300. For this reason, the emitter terminal NE always receives a signal of H level from the connection detecting line L300. For this reason, even when a power is not supplied to the unit OPFnA and thus its operation suspends, the PNP transistor TR is in an ON state.

On the other hand, when the unit OPFn is operating and receives an interruption signal of H level output from the microcomputer MFn, the PNP transistor TR is in an OFF state. For this reason, the connection between the connection detecting line L300 and the slide switch 24 (and the conducting line L302 or L303) is interrupted. In this case, since the voltage level of the connection detecting line L300 becomes the H level, the microcomputer M0 of the AV apparatus 10 determines that the unit OPFn to be controlled is not connected.

That is to say, the use of the interruption circuit 23 enables the generation of pseudo unconnected state even when the unit OPFn in the controlled object mode is connected to the AV apparatus 10.

[Microcomputer]

The microcomputer MFn controls the entire unit OPFnA. The microcomputer MFn is connected to the reset signal line L201. The microcomputer MFn receives the supply of the power and receives a reset signal of H level from the microcomputer M0, the microcomputer MFn is activated.

The microcomputer MFn mainly (A) controls the interruption circuit 23, (B) checks a switch condition of the slide switch, (C) changes over the function switch 25, and (D) activates the microcomputer MFn+1 in the unit OPFn adjacent on the rear.

(A) Control of the Interruption Circuit 23

The microcomputer MFn activates (H level) an interruption signal so as to bring the PNP transistor TR in the interruption circuit 23 into the OFF state. Further, the microcomputer MFn inactivates (L level) an interruption signal so as to bring the transistor TR into the ON state.

(B) Checking of the Switch Condition of the Slide Switch

The microcomputer MFn checks whether the setting condition of the slide switch 24 is "the controlled object mode" or "the through mode" based on the voltage level of the switch detecting line L700.

(C) Switching of the Function Switch

The microcomputer MFn switches the function switch 25 according to the setting condition of the slide switch.

(D) Activation of the Microcomputer MFn+1 in the Unit OPFn+1 Adjacent on the Rear When the unit to be controlled is connected to the rear, the microcomputer MFn outputs a reset signal of H level to the unit OPFn+1 adjacent on the rear. As a result, the microcomputer MFn+1 of the unit OPFn+1 adjacent on the rear is activated.

[Constitution of the Fixed Type Unit]

With reference to FIG. 3, the fixed type unit OPFnB contains the contents generating unit 30 corresponding to the contents apparatus 30 in comparison with the detachable type unit OPFnA. For this reason, the connector 28 is not present. The self side signal line group 1000 is connected to the contents generating unit 30. The ground terminal GND in the contents generating unit 30 is connected to the conducting line L302. The self side signal line group 1000 other than the conductive line L302 is connected to the contents signal output unit 31. The contents generating unit 30 is, for example, a tuner circuit, a DVD player, an HDD player, or the like.

The other parts of the constitution are the same as those of the detachable type unit OPFnA. When the unit OPFn is simply referred in the specification, it can be applied to detachable type and fixed type units.

[Outline of the Operation]

The operation of the AV system having the above constitution is described.

[Reduction in the Power Consumption]

Figure 5:
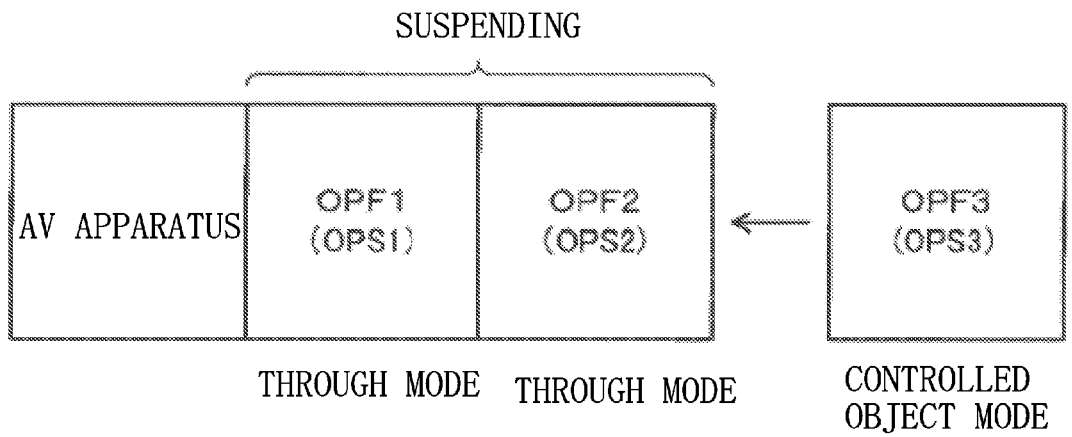
FIG. 5 is a pattern diagram describing an operation outline of the AV system in FIG. 3.

When the voltage level of the connection detecting line L300 is in the H level, the AV apparatus 10 interrupts the power supply using the interruption circuit 12. When the voltage is in the L level, the AV apparatus 10 supplies the power. With reference to FIG. 5, when the units OPF1 and OPF2 are not going to be controlled, the user manually changes over the slide switches 24 of the units OPF1 and OPF2, so as to set the units into "the through mode". In this case, the connection detecting line L300 of the AV apparatus 10 is connected to neither the ground terminals GND of the units OPF1 nor OPF2. Instead of this, the connection detecting line L300 is connected to the conducting lines L303 in the units OPF1 and OPF2. The connector 27 side of the conductive line L303 of the unit OPF2 is opened (open end). For this reason, the connection detecting line L300 is in the H level (high-impedance state), so that the power supply is interrupted. That is to say, when the unit OPFn to be controlled is not present in the AV system 1, the power is not supplied, and thus the power consumption is repressed. Since the slide switch 24 is the mechanical switch, even if the power supply is interrupted, the slide switch 24 maintains "the through mode".

[Detection of the Connection of the Unit to be Controlled]

As shown in FIG. 5, it is assumed that the user connects a new unit OPF3 in the daisy chain and operates this unit OPF3 as an object to be controlled (case 1). In this case, the user operates the slide switch 24 of the unit OPF3 so as to set it into "the controlled object mode". At this time, the conducting line L301 in the unit OPF3 is connected to the ground terminal GND. It is assumed that when the unit OPF3 is the detachable type unit OPF3A, the contents apparatus 30 is attached thereto.

When the unit OPF3 is connected to the OPF2, the ground terminal GND of the unit OPF3 is connected to the connection detecting line L300 in the AV apparatus 10. For this reason, the connection detecting line L300 is brought into the L level, so that the AV apparatus 10 supplies a power.

The slide switch 24 can maintain "the thorough mode" without the power supply. For this reason, even if the power is no supplied to the units OPF1 to OPFn−1 on the former stage of the unit OPFn to be controlled, the AV apparatus 10 can detect the connection of the units OPFn to be controlled, so as to be capable of supplying a power thereto.

When the unit OPF3 is the detachable type unit OPF3A (case 2) and the contents apparatus 30 is removed from the unit OPF3A, the AV apparatus 10 suspends the supply of the power. However, the connection detecting line L300 of the AV apparatus 10 is connected to the conducting line L302 of the unit OPF3A by the slide switches 24 in the units OPF1, OPF2 and OPF3A. Therefore, when the contents apparatus 30 is attached to the unit OPF3A again, the connection detecting line L300 in the AV apparatus 10 is in the L level, so that the AV apparatus 10 supplies a power. That is to say, even when the operations of the units OPF1 to OPF3A are suspended, the AV apparatus 10 can detect the attachment of the contents apparatus 30.

[Detection of the Switching of the Object to be Controlled]

Figure 6:
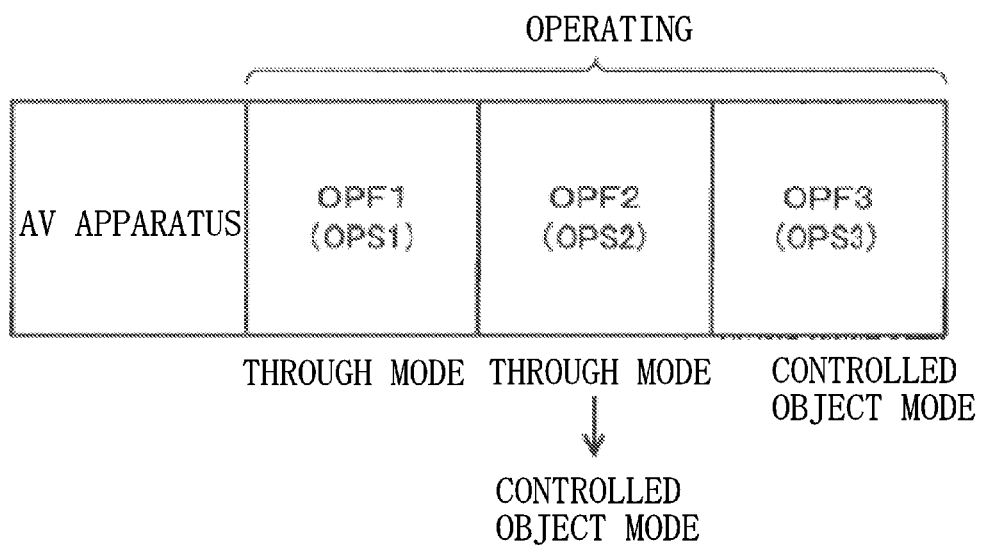
FIG. 6 is another pattern diagram different from FIG. 5 describing an operation outline of the AV system in FIG. 3.

With reference to FIG. 6, it is assumed that the unit OPF3 is operating in the controlled object mode, and the units OPF1 and OPF2 are in the through mode in the AV system 1. In this case, the power is supplied also to the units OPF1 and OPF2.

When the user desires to change the object to be controlled from the unit OPF3 into the unit OPF2, the user operates the slide switch 24 of the unit OPF2 so as to set the unit OPF2 into "the controlled object mode" (case 3). In this case, a connecting destination of the connection detecting line L300 is simply changed from the ground terminal GND in the unit OPF3 into the ground terminal GND in the unit OPF2. Therefore, without the interruption circuit 23, even through the object to be controlled is switched, the voltage level of the connection detecting line L300 is not changed and thus is maintained in the L level. For this reason, the AV apparatus 10 cannot recognize that the object to be controlled is switched.

The microcomputer M0 of the AV apparatus 10 controls the contents signal generating unit 30 according to a type of the contents signal generating unit (or the contents apparatus, hereinafter, they are collectively referred as the contents signal generating unit) in the unit OPFn. For this reason, even through the object to be controlled is switched, the AV apparatus 10 tries to control the new unit OPF2 to be controlled according to a control method corresponding to the previous unit OPF3 to be controlled. For this reason, the new unit OPF2 to be controlled cannot be controlled in some cases.

The interruption circuit 23 in the unit OPFn solves such a problem. When the mode of the slide switch 24 is changed, the interruption circuit 23 interrupts the connection with the connection detecting line L300. At this time, the connection detecting line L300 is in the H level. For this reason, the unit OPF2 to be controlled is still connected, but the AV apparatus 10 falsely recognizes that the unit OPFn to be controlled is not connected. The interruption circuit 23 cancels the interruption after a predetermined operation. At this time, the AV apparatus 10 falsely recognizes that the unit OPF2 to be controlled is connected, and inquire about the type of the contents signal generating unit 3 in the unit OPF2. The AV apparatus 10 then makes control according to a control method corresponding to the type of the unit OPF2.

In short, the interrupted circuit 23 generates the unconnected state of the unit OPFn to be controlled in a pseudo manner. For this reason, even in the case of FIG. 6, the AV apparatus 10 can inquire at the unit to be controlled about its type.

[Details of the Operation]

Figure 7:
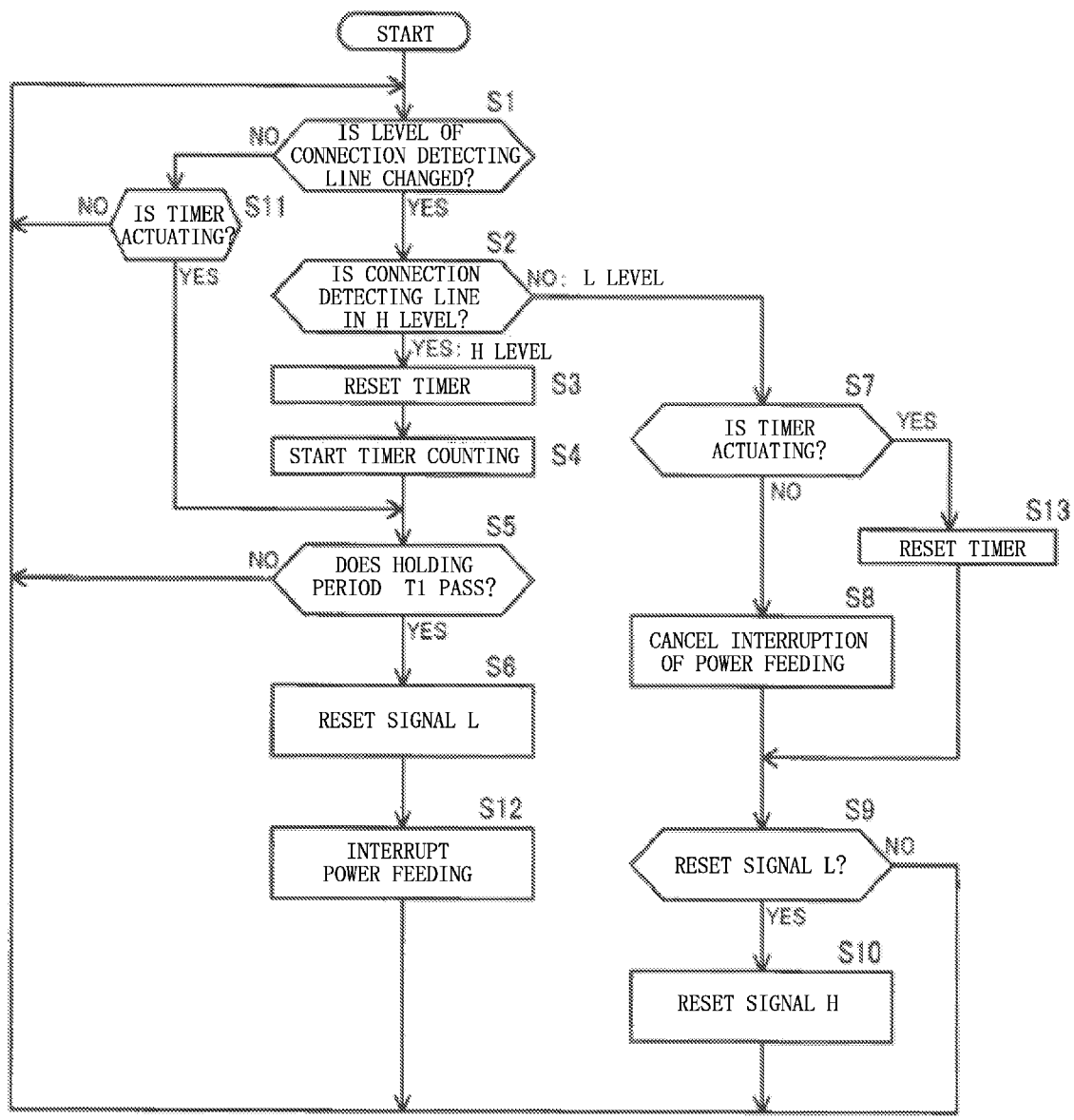
FIG. 7 is a flowchart describing details of an operation for determining power supply or suspension of the power supply of the AV apparatus in FIG. 3.
Figure 8:
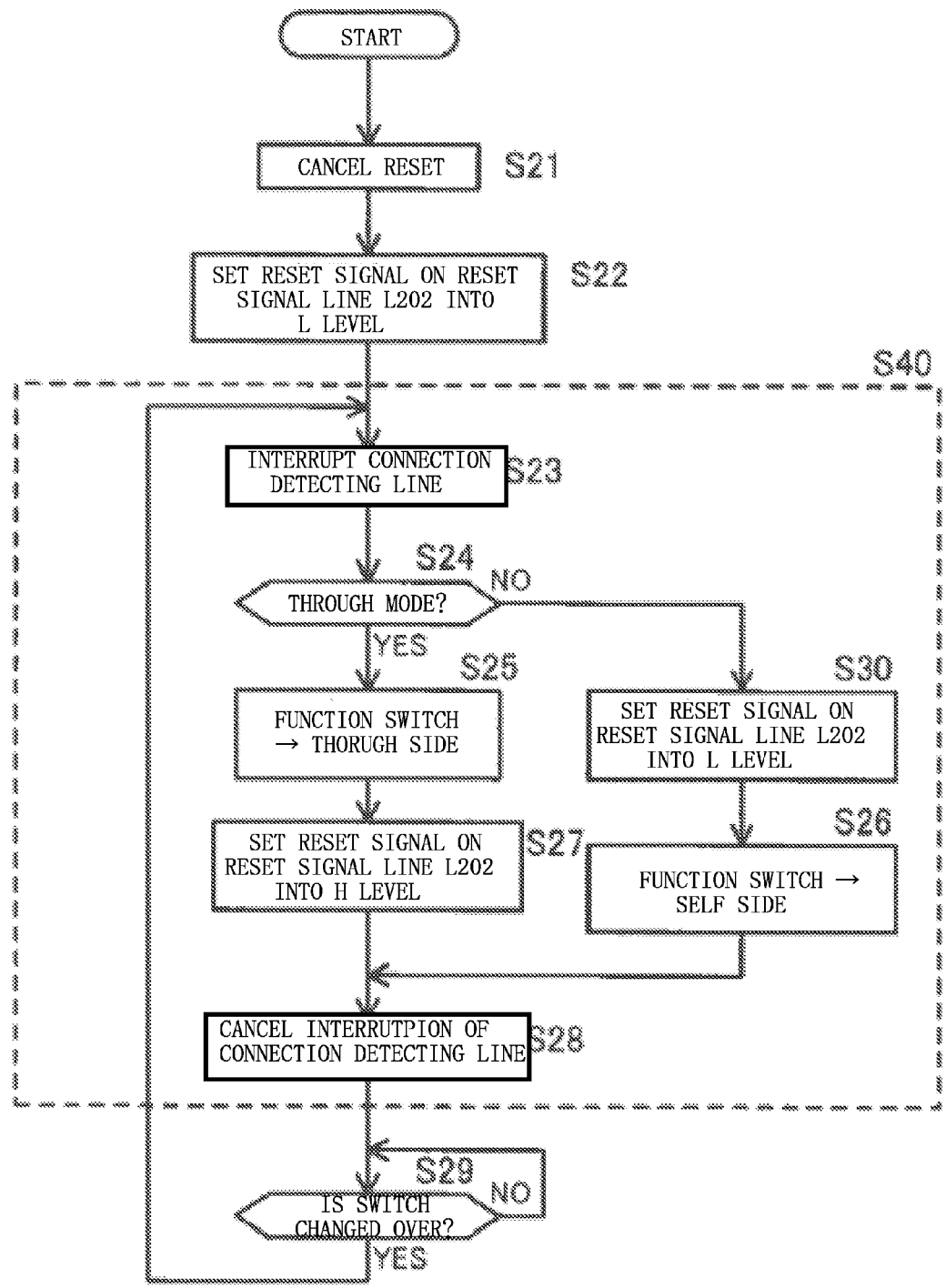
FIG. 8 is a flowchart describing details of an operation of the option units in FIG. 3.

Details of the above operation are described. FIG. 7 is a flowchart illustrating the operation of the AV apparatus 10, and FIG. 8 is a flowchart illustrating the operation of the unit OPFn. The cases 1 to 3 are exemplified, and the operations of the AV apparatus 10 and the units OPFn in the respective cases are described with reference to FIGS. 7 and 8.

[Case 1]

With reference to FIG. 5, the case where the units OPF1 and OPF2 are connected to the AV apparatus 10 is assumed. Both the units OPF1 and OPF2 are set into "the through mode". The slide switches 24 in the units OPF1 and OPF2 are moved downward in FIG. 3. In this case, contacts P241 and P242 in the slide switch 24 are connected. For this reason, the connection detecting line L300 is connected to the conducting lines L303 of the units OPF1 and OPF2. The terminal of the conducting line L303 of the unit OPF2 on the connector 27 side is opened. In this case, the connection detecting line L300 is in the H level (high-impedance state), and the supply of the power is interrupted. Since the supply of the power is interrupted, the microcomputers MF1 and MF2 in the units OPF1 and OPF2 are not activated. As shown in FIG. 5, the unit OPF3 is assumed to be connected in the daisy chain. When the unit OPF3 is detachable type, the contents apparatus 30 is attached to the connector 28. The description refers to this case.

When the unit OPF3 is connected to the unit OPF2, the ground terminal GND in the contents signal generating unit 30 in the unit OPF3 is connected to the connection detecting line L300. With reference to FIG. 7, the AV apparatus 10 monitors a change in the voltage level of the connection detecting line L300 (S1). When the unit OPF3 is connected, the microcomputer M0 determines that the voltage level of the connection detecting line L300 is in the L level (YES at S1, NO at S2). At this time, since the timer is not activated (NO at S7), the microcomputer M0 controls the interruption circuit 12 so as to cancel the interruption of the power supply (S8). Concretely, the microcomputer M0 outputs an interruption signal of H level. The relay switch of the interruption circuit 12 receives the interruption signal of H level, so as to be in the ON state. For this reason, the power is output from the power supply circuit 11 via the power supply line L100. Thereafter, the microcomputer M0 outputs a reset signal of H level to the reset signal line L200. This is because the unit OPF1 is activated.

[Activation of the Unit OPF1]

With reference to FIG. 8, the unit OPF1 receives the supply of the power through the power receiving line L101. At this time, the power supply circuit 21 receives the supply of the power from the power receiving line L101, and supplies a predetermined voltage VC1 to the respective main sections of the unit OPF1.

The microcomputer MF1 in the unit OPF1 receives the supply of the power from the power supply circuit 21. The microcomputer MF1 receives a reset signal of H level via the reset signal line L201 so as to be activated (S21). After the activation, the microcomputer MF1 sets the reset signal to be output to the reset signal line L202 into L level (S22). This is because the unit OPF2 adjacent on the rear is prevented from being activated before the completion of the setting of the function switch 25.

The microcomputer MF1 then executes a function switch setting process (S40). The function switch 25 cannot maintain the connected state when the supply of the power is interrupted. For this reason, the microcomputer MF1 sets the function switch 25 into a predetermined state (the controlled object mode or the through mode) every activation.

In the function switch setting process (S40), the interruption circuit 23 interrupts the connection with the connection detecting line L300 at the beginning of the process (S23), and cancels the interruption of the connection with the connection detecting line L300 at the last of the process (S28). In short, when the function switch 25 is set, the microcomputer MF1 generates a pseudo unconnected state for a constant period (the period from steps S23 to S28). Hereinafter, this period is called a function process setting period. This process prepares for the above case 3. That is to say, this is the process for enabling the microcomputer M0 of the AV apparatus 10 to correspond to the switching of the object to be controlled.

In the function switch setting process (S40), the microcomputer MF1 first controls the interruption circuit 23 so as to interrupt the connection with the connection detecting line L300 (S23). Concretely, the microcomputer MF1 outputs an interruption signal of H level to the interruption circuit 23. Since the interruption circuit 23 receives the interruption signal of H level through the base terminal NB of the PNP transistor TR, the PNP transistor TR is turned off (not conductive). As a result, the connection detecting line L300 and the conducting line L302 are disconnected.

The operation at step S23 brings the voltage level of the connection detecting line L300 into the H level (high-impedance state). For this reason, the microcomputer M0 in the AV apparatus 10 determines that the connection detecting line L300 is in the H level (Yes at S1, YES at S2). In this case, the microcomputer M0 resets the built-in timer (S3), and starts to count the timer (S4). Even after the timer is started to be counted, the microcomputer M0 monitors a change in the voltage level of the connection detecting line L300 (S1). The microcomputer M0 monitors whether a holding period ΔT1 passes (S5) during the activation of the timer (YES at S11) with the voltage level of the connection detecting line L300 being in the L level (NO at S1). When the holding period ΔT1 passes with the voltage of the connection detecting line L300 being maintained in the L level (NO at S1, YES at S11, and YES at S5), the microcomputer M0 sets the reset signal on the reset signal line L200 to the L level (S6), and further interrupts the supply of the power using the interrupted circuit 12 (S12).

In short, the microcomputer M0 does not immediately suspend the supply of the power after the voltage level of the connection detecting line L300 is changed into the H level, and the constant holding time (ΔT1) is set. In the case where the unit is set into the pseudo unconnected state, when the microcomputer M0 immediately suspends the supply of the power, the connected unit OPFn to be controlled cannot actually operate. Therefore, the holding period ΔT1 is set so as to be longer than the function process setting period. As a result, in the case that the pseudo unconnected state is generated, it is prevented the supply of the power from being interrupted.

The sequence returns to the function process (S40 in FIG. 8) in the unit OPF1, and the microcomputer MF1 checks the connected state (setting mode) of the slide switch 24. The microcomputer MF1 detects the signal level on the switch detecting line L700. In the case 1, since the unit OPF1 is in "the through mode", the contacts P244 and P245 are connected by the operating piece SW. For this reason, the signal on the switch detecting line L700 is in the L level.

When the signal on the switch detection line L700 is in the L level, the microcomputer MF1 determines that it is in "the through mode" (YES at S24). For this reason, the microcomputer MF1 sets the through side signal line group 2000 as a connecting destination of the switch elements 251 to 254 of the function switch 25 (S25). Concretely, the switch element 251 connects the power receiving lines L101 and L103. Similarly, the switch element 252 connects the communication lines L401 and L403, and the switch element 253 connects the video signal lines L501 and L503. The switch element 254 connects the sound signal lines L601 and L603. As a result, the AV apparatus 10 is communicable with the unit OPFn on the subsequent stage of the unit OPF1.

Thereafter, since the microcomputer MF1 operates the unit OPF2 adjacent on the rear, the reset signal on the reset signal line L202 is activated from the L level into the H level (S27). And as mentioned above, the interruption of the connection with the connection detecting line L300 is canceled at step S28 (S28). Concretely, the microcomputer MF1 outputs an interruption signal of L level. As a result, the PNP transistor in the interruption circuit 23 is in the ON state, so that the connection detecting line L300 is connected to the slide switch 24.

As mentioned above, the time for the function setting process S40 (the function setting process period) is shorter than the holding period ΔT1. For this reason, the microcomputer M0 in the AV apparatus 10 determines that the voltage level of the connection detecting line L300 is changed into the L level earlier than the passing of the holding period ΔT1 (NO at S1). At this time, since the timer is operating (YES at S7), the supply of the power is not interrupted but is maintained. The timer is then reset (S13). Further, since the reset signal on the reset signal line L200 is already in the H level (YES at S9), the reset signal is maintained in the H level.

With the above operation, the unit OPF1 completes the function setting process S40, and completes the through mode state.

[Activation of the Unit OPF2]

According to the operation at step S25 in the function setting process (S40) of the unit OPF1, the power is supplied to the unit OPF2. According to the operation at step S27, a reset signal of H level is output to the microcomputer MF2 in the unit OPF2. As a result, the microcomputer MF2 cancels the resetting (S21), and is activated. The microcomputer MF2 executes the function setting process (S40) and completes the through mode state similarly to the unit OPF1.

[Operation of the Unit OPF3]

According to the operation at step S25 of the unit OPF2, the power is supplied to the unit OPF3. According to the operation at step S27, a reset signal of H level is output to the microcomputer MF3 in the unit OPF3. For this reason, the microcomputer MF3 cancels the resetting (S21), and is activated. The microcomputer MF3 then executes the function process (S40).

The slide switch 24 in the unit OPF3 is set into the controlled object mode. That is to say, the operating piece SW connects the contacts P245 and P246. For this reason, the voltage level on the switch detecting line L700 is in the H level (high-impedance state). Therefore, the microcomputer MF3 determines that the slide switch 24 is in "the controlled object mode" (NO at S24). At this time, the microcomputer MF3 sets the reset signal on the reset signal line L202 into the L level (S30). This is because the unit on the subsequent stage of the unit OPF3 does not have to be activated. Thereafter, the microcomputer MP3 switches the connecting destination of the function switch 25 into the self side signal line group 1000 (S26). Concretely, the switch element 251 connects the power receiving lines L101 and L102. Similarly, the switch element 252 connects the communication lines L401 and L402, and the switch element 253 connects the video signal lines L501 and L502. The switch element 254 connects the sound signal lines L601 and L602. As a result, the AV apparatus 10 is communicable with the contents signal generating unit 30 in the unit OPF3.

[Process for Determining the Control Method of the Unit OPF3 by Means of the AV Apparatus 10]

The AV apparatus 10 makes control according to the type of the unit OPFn. For example, when the unit OPFn is a DVD player, an HDD player or the like, it outputs an instruction for reproducing contents or an instruction for suspending contents. When the unit OPFn is a tuner device, it outputs a selecting instruction or the like.

Figure 9:
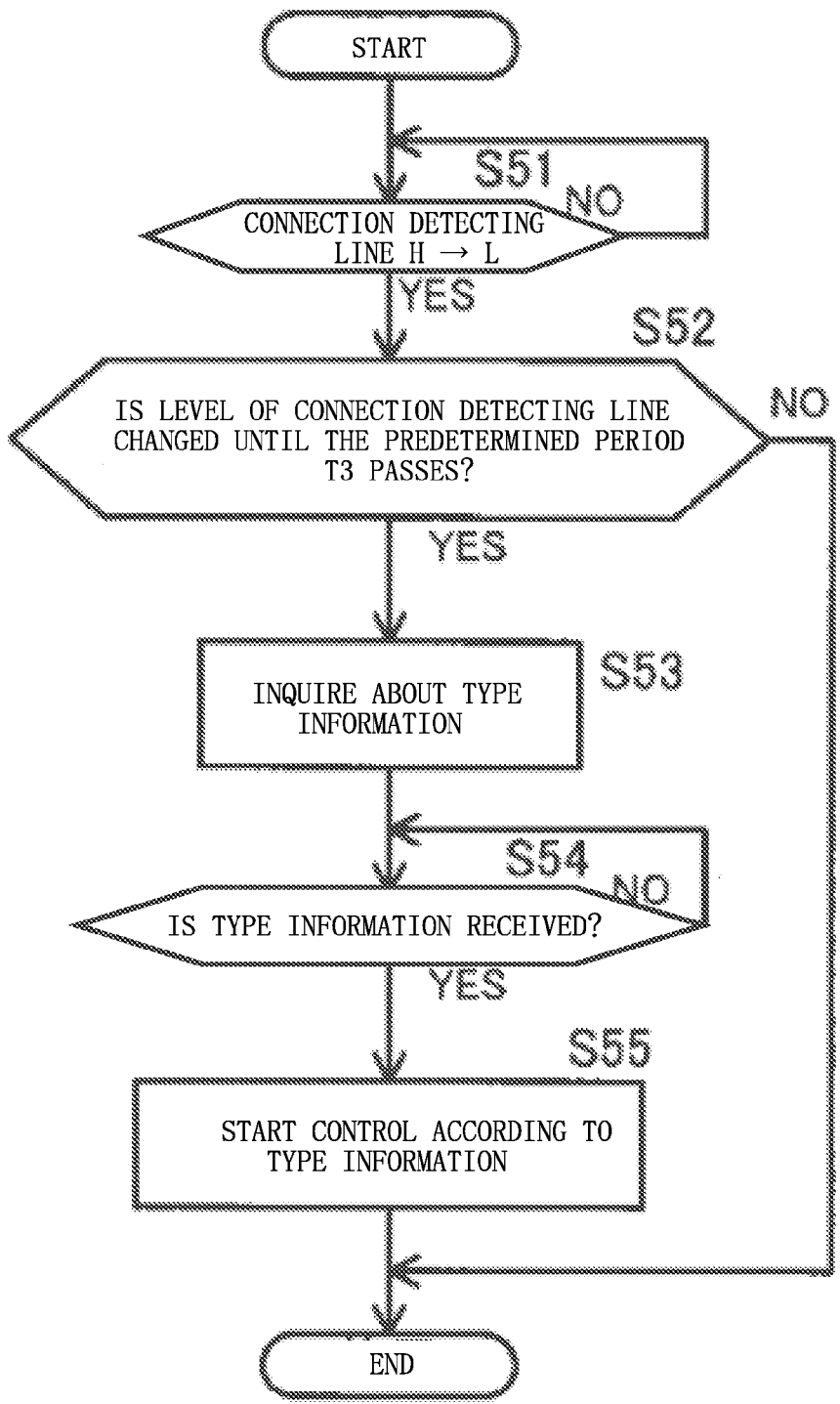
FIG. 9 is a flowchart illustrating a processing operation of the AV apparatus for making control according to a type of the option units in FIG. 3.

With reference to FIG. 9, when the voltage level of the connection detecting line L300 is changed from the H level into the L level (S51), the microcomputer M0 in the AV apparatus 10 monitors the level of the connection detecting line L300 until a predetermined period ΔT3 passes (S52). When the connection detecting line L300 is in the H level until the predetermined period ΔT3 passes (NO at S52), the operation ends. This case means that the unit OPFn in the controlled object mode is not present.

On the other hand, as a result of the determination at step S52, when the connection detecting line L300 is maintained in the L level until the predetermined period ΔT3 passes (NO at S52), the activation of the unit OPF3 in the controlled object mode is completed, and thus the unit OPF3 can receive the control from the AV apparatus 10. For this reason, the microcomputer M0 in the AV apparatus 10 outputs a command for requesting type information (S53). The unit OPF3 receives the request command via the communication lines L401 and L402, and outputs type information representing its type.

The microcomputer M0 receives the type information via the communication line L400 (YES at S54). The microcomputer M0 reads a control command group according to the type information from the memory, and outputs the control command selected according to a user's operation to the unit OPF3. The above operation enables the AV apparatus 10 to make control according to the type of the unit OPFn in the controlled object mode.

[Case 2]

A case where the unit OPF3 is the detachable type unit OPF3A is assumed. When the contents apparatus 30 is removed from the connector 28, the AV apparatus 10 suspends the supply of the power to the units OPF1 to OPF3 so that the power consumption can be reduced. In the case where the unit OPF3 in FIG. 5 is the detachable type unit OPF3A, the operation of the AV system with the contents signal generating unit 30 is removed is described below.

When a user removes the contents apparatus 30 (for example, DAP, etc.) from the connector 28 of the unit OPF3A, the conductive line L302 is disconnected from the ground terminal GND of the contents apparatus 30. At this time, the voltage level of the connection detecting line L300 is in the high-impedance state.

The microcomputer M0 of the AV apparatus 10 determines that the connection detecting line L300 is changed from the L level into the H level (YES at S1, YES at S2). For this reason, the timer counting starts (S3 and S4). After the holding period ΔT1 passes (YES at S5), the microcomputer M0 sets the reset signal into the L level (S6), and interrupts the supply of the power using the interruption circuit 12 (S12). After the supply of the power is interrupted, the timer is reset.

The supply of the power to the units OPF1, OPF2 and OPF3A is interrupted at the above steps, and the operation suspends. For this reason, the power consumption can be reduced.

Even if the supply of the power is interrupted, the slide switches 24 of the units OPF1 and OPF2 are maintained in the connected state of "the through mode", and the slide switch 24 of the unit OPF3A is maintained in the connected state of "the controlled object mode". For this reason, when the contents apparatus 30 is again connected to the connector 28, the AV system 1 again executes the similar operation to that in the case 1, so that the unit OPF3A can be controlled.

[Case 3]

As shown in FIG. 6, the operation of the AV system 1 in the case where the unit used by the user is changed from the unit OPF3 into the unit OPF2 is described.

In this case, the user manually operates the operating piece SW of the slide switch 24 of the unit OPF2 so as to set the unit OPF2 into the "controlled object mode". At this time, in the slide switch 24, the contacts P242 and P243 are connected, and the contacts P245 and P246 are connected. For this reason, the voltage of the switch detecting line L700 is changed into the H level. According to the voltage change in the switch detecting line L700, the microcomputer MF2 of the unit OPF2 determines that the mode of the slide switch 24 is changed at step S29 in FIG. 8 (YES at S29). Returned to step S23, the microcomputer MF2 interrupts the connection detecting line L300 (S23). That is to say, the pseudo unconnected state is generated.

Thereafter, the microcomputer MF2 determines that the slide switch 24 is set into "the controlled object mode" based on the switch detecting line L700 of H level (NO at S24). For this reason, the microcomputer MF2 sets the reset signal on the reset signal line L202 into the L level (S30). The microcomputer MF2 then sets the connecting destination of the function switch 25 to the self side signal line group 1000 (S26). After the function switch 25 is switched, the microcomputer MF2 cancels the interruption of the connection detecting line L300. The switching of the function switch 25 interrupts the supply of the power to the unit OPF3. The above operation suspends the operation of the unit OPF3.

With the operation of the microcomputer MF2 at step S28, the microcomputer M0 of the AV apparatus 10 determines that the connection detecting line L300 is changed into the L level at step S51 shown in FIG. 9 (S51). After the predetermined period ΔT3 passes, the microcomputer M0 inquires about the type information (S53). The microcomputer MF2 accepts the inquiry so as to output the type information to the microcomputer M0. The microcomputer M0 receives the type information (YES at S54), and controls the unit OPF2 according to the type information.

In the case 3, the AV apparatus 10 does not interrupt the supply of the power, but forcibly changes the voltage level of the connection detecting line L300 using the interruption circuit 23 in the unit OPFn. That is to say, the pseudo unconnected state is generated. As a result, the microcomputer M0 of the AV apparatus 10 can detect the switching of the unit OPFn to be controlled, and can make control according to the type of the unit OPFn to be controlled.

Second Embodiment

In the first embodiment, the user manually changes over the slide switches 24 of the units OPF1 to OPFn so as to specify the unit OPFn to be controlled. However, the option unit to be controlled may be specified by the AV apparatus.

Figure 10:
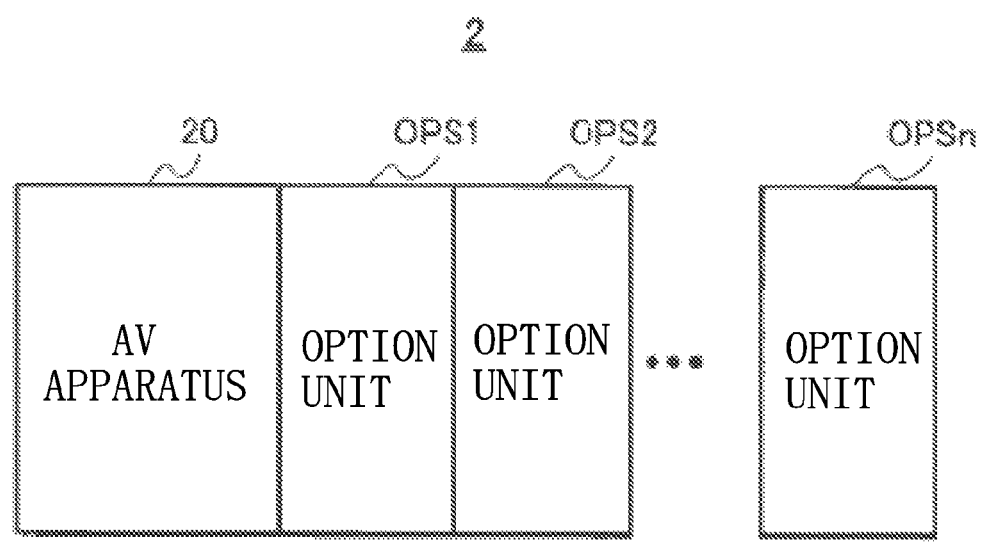
FIG. 10 is a functional block diagram illustrating an entire constitution of the AV system according to a second embodiment of the present invention.

With reference to FIG. 10, similarly to the first embodiment, also in an AV system 2 according to a second embodiment, an AV apparatus 20 is connected in the daisy chain to the option units OPS1 to OPSn.

[AV Apparatus]

Figure 11:
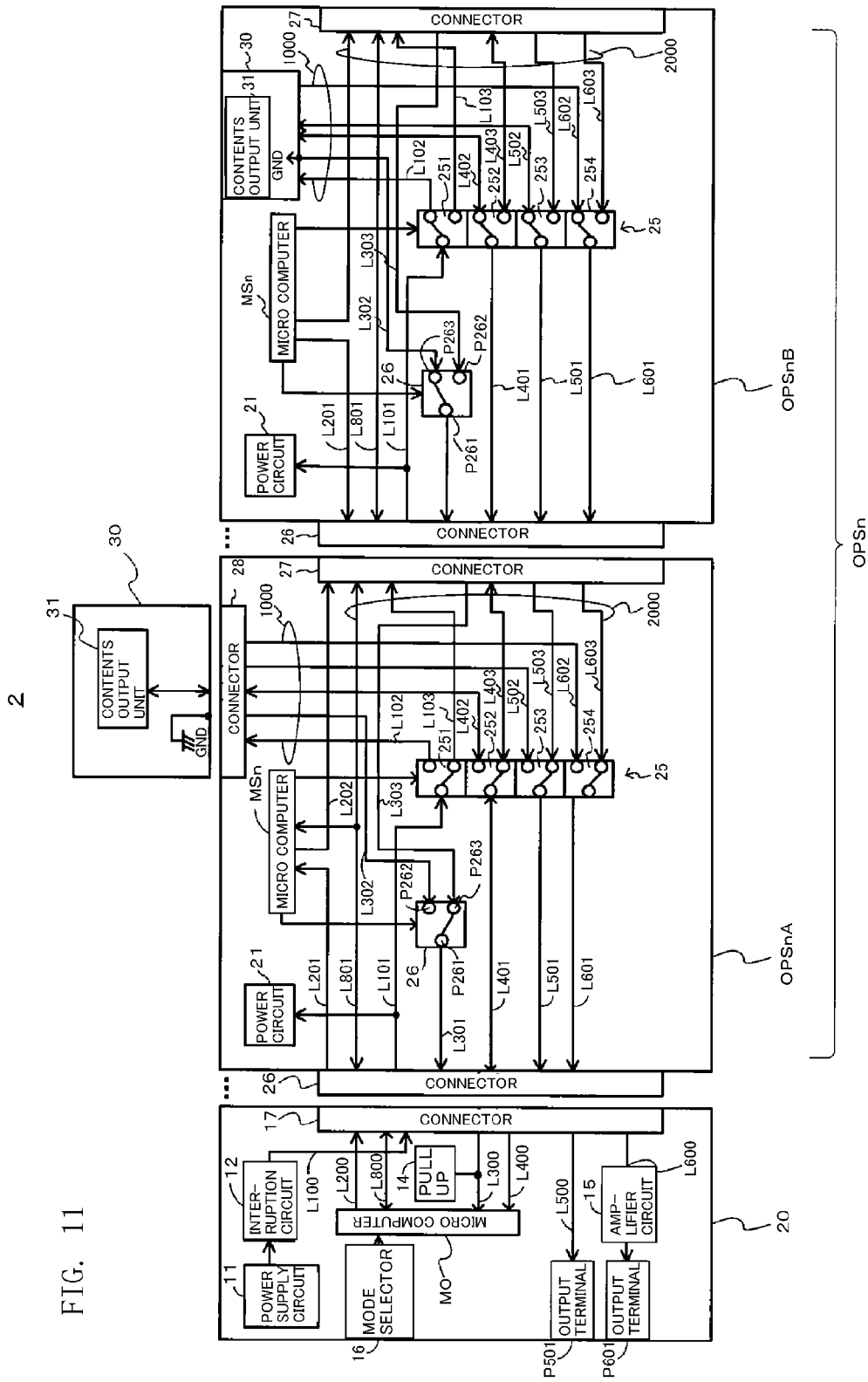
FIG. 11 is a functional block diagram illustrating constitutions of the AV apparatus and the option units in FIG. 10

With reference to FIG. 11, in comparison with the AV apparatus 10, the AV apparatus 20 further has a mode selector 16 and an I2C bus L800.

[Mode Selector]

The mode selector 16 selects the unit OPSn to be controlled from the plurality of units OPS1 to OPSn according to the user's operation. The I2C bus L800 is used for identifying the units OPS1 to OPSn connected in the daisy chain. The AV apparatus 20 stores identification numbers of the units OPS1 to OPSn connected in the daisy chain into the memory in the microcomputer M0. The identification numbers of the units OPS1 to OPSn are incremented one by one in order where the units are connected to the AV apparatus 20 so as to be given to them. That is to say, in this example, the identification number "1" is given to the unit OPS1, "2" is given to the unit OPS2, and "n" is given to the unit OPSn. In this example, the numbers are incremented by 1 in order where the units are connected to the AV apparatus 20, but the numbers may be incremented by a predetermined numerical value larger than one in connected order. The numbers are sequentially decremented from a predetermined numerical value in connected order so as to be given to the units.

[I2C Bus]

The I2C bus L800 is utilized for specifying the unit OPSn to be controlled. One end of the I2C bus L800 is connected to the microcomputer M0, and the other end is connected to an input/output terminal, not shown, in the connector 17.

The microcomputer M0 instructs the specified unit OPSn using the identification number ID of the unit OPSn specified by the mode selector 16. The microcomputer M0 further stores an operation flag in a memory, not shown. When the operation flag is ON, the specified unit OPSn specified by the mode selector 16 is in the controlled object mode and receives the supply of the power so as to be in the operable state. On the other hand, when the operation flag is OFF, the operating unit OPSn is not present in the AV system 2. For example, the unit OPSn connected to the AV apparatus 20 is not present, or although the unit OPSn is connected, the operation suspends. The other parts of the constitution are the same as those of the AV apparatus 10.

[Option Unit]

[Detachable Type Unit]

With reference to FIG. 11, in comparison with the unit OPFnA, the detachable type unit OPSnA has a latching relay 26 instead of the interruption circuit 23 and the slide switch 24. The latching relay 26 includes contacts P261 to P263, and further includes a coil and a permanent magnetic, not shown. In the latching relay 26, the coil operates according to a signal from the microcomputer MSn so that the contact is switched. Further, after the switching, the switched contact state can be maintained by a magnetic force of the permanent magnet. For this reason, the power does not have to be always supplied in order to maintain the contact state.

The contact P261 is connected to the interruption circuit 23. The contact P262 is connected to the conducting line L302, and the contact P263 is connected to the conducting line L303.

The unit OPSnA further has an I2C bus L801. The I2C bus L801 is connected to the microcomputer MSn. Further the I2C bus L801 is connected to the I2C bus L800 via the connectors 26 and 17. Further, the I2C bus L801 is connected to the I2C bus L801 of the unit OPSn+1 adjacent on the rear via the connectors 27 and 26. Even when the unit OPSnA does not have the interruption circuit 23, the AV apparatus 20 can detect the switching of the unit OPSn to be controlled according to the process using the I2C buses L800 and L801.

The other parts of the constitution are the same as those of the option unit OPFnA.

[Fixed Type Unit]

With reference to FIG. 11, in comparison with the detachable type unit OPFnB, the fixed type unit OPSnB also has the latching relay 26 and the I2C bus L801 instead of the interruption circuit 23 and the slide switch 24. The other parts of the constitution are the same as those of the fixed type unit OPFnB.

[Outline of the Operation]

In the AV system 2, each of the units OPS1 to OPSn has the latching relay 26 and the I2C bus L801. The latching relays 26 of the units OPSn are controlled in response to the instruction from the microcomputer M0 of the AV apparatus 20 transmitted via the I2C buses L800 and L801. In other words, the AV apparatus 20 can control the latching relays 26 of the units OPSn, and can specify the unit OPSn to be controlled. For this reason, like the AV system 1, the user does not have to manually change over the slide switch 25 of each unit OPFn.

Figure 12:
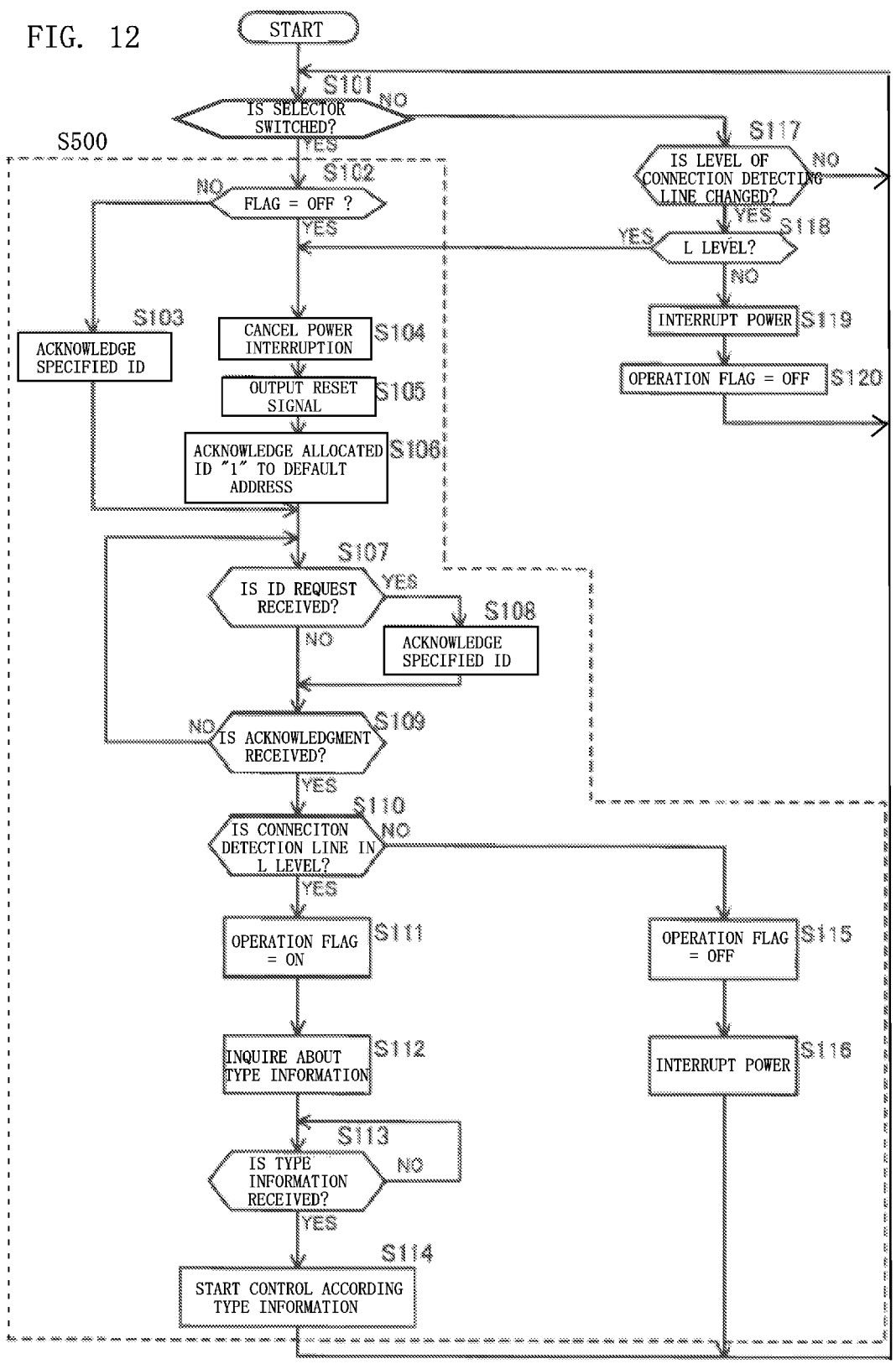
FIG. 12 is a flowchart illustrating details of the operation of the AV apparatus in FIG. 11.
Figure 13A:
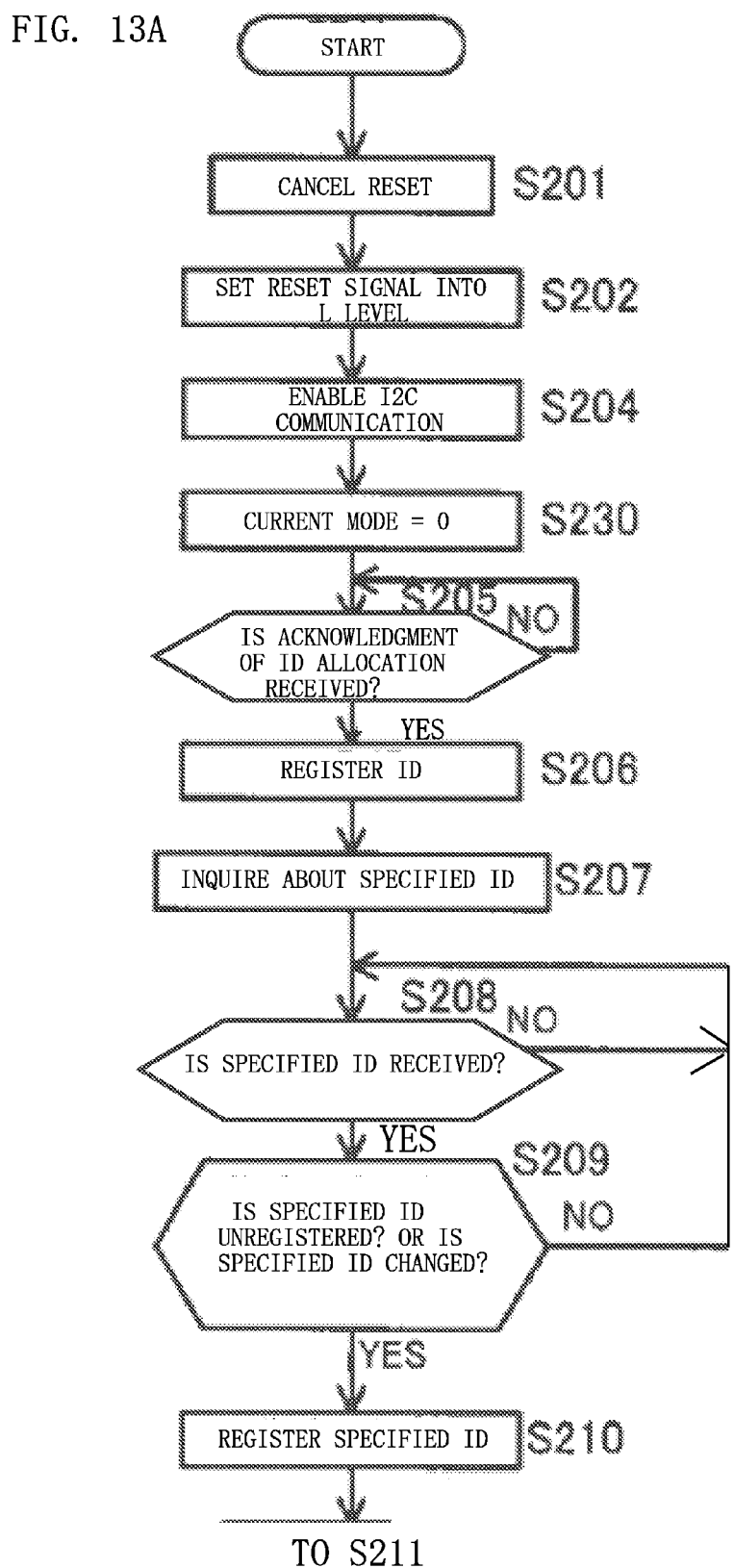
FIGS. 13A and 13B are a flowchart illustrating details of an operation of the option units in FIG. 11.
Figure 13B:
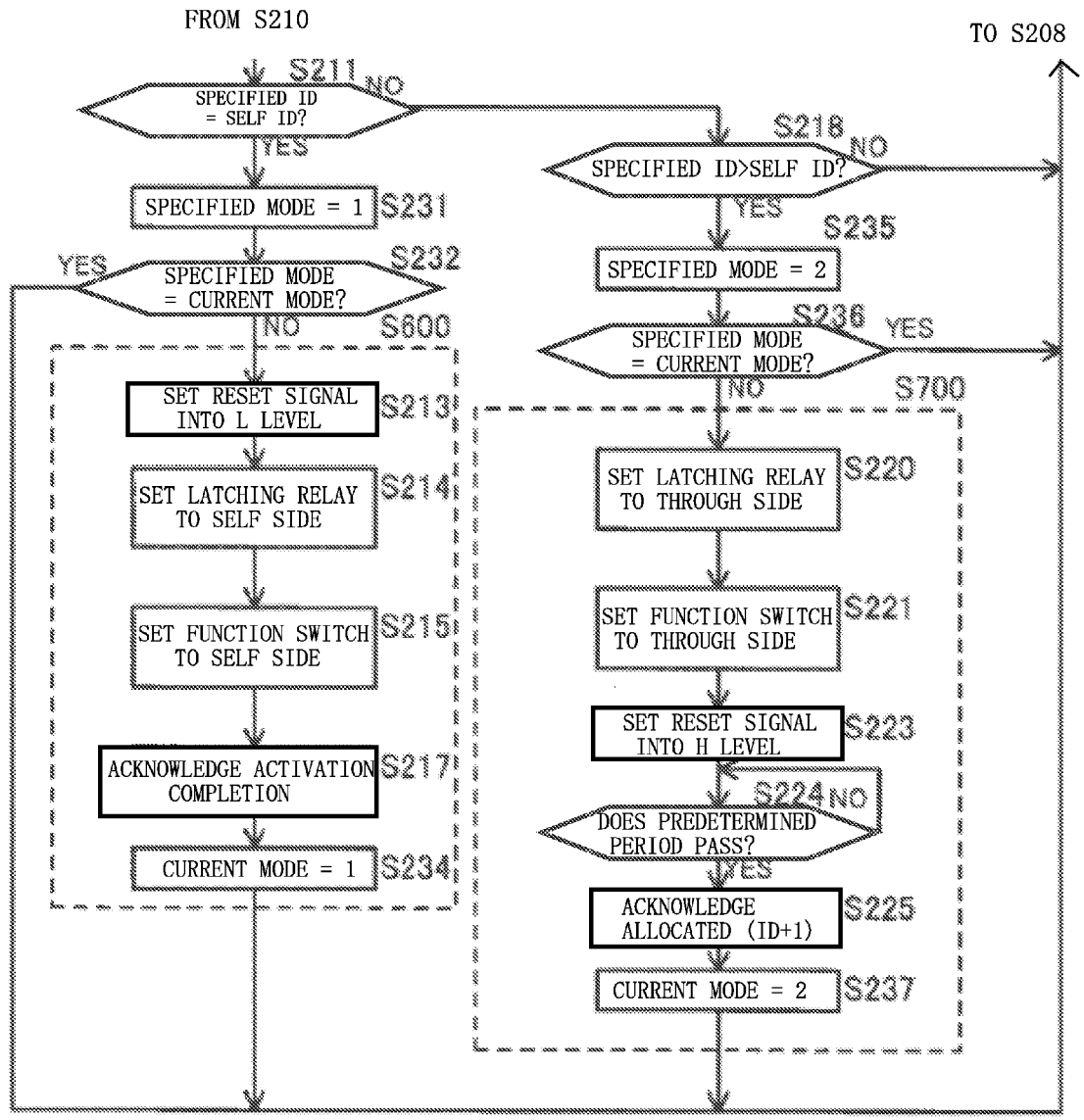

FIG. 12 is a flowchart illustrating details of the operation of the AV apparatus 20, and FIGS. 13A and 13B are a flowchart illustrating details of the operation of the unit OPSn. Similarly to the first embodiment, the operations of the AV system 2 in the cases 1 to 3 are described in detail below.

[Case 1]

As shown in FIG. 5, when the units OPS1 and OPS2 are connected in the daisy chain to the AV apparatus 20, the case where the user connects the unit OPS3 to the unit OPS2 is assumed. It is assumed that when the unit OPS3 is the detachable type unit OPS3A, the contents apparatus 30 is attached.

The case where the user desires to operate the unit OPS3 to be controlled is assumed. For example, the unit OPS3 is a cradle to which the DAP 30 is attached, and the user desires to control the unit OPS3 through the AV apparatus 10 so as to reproduce the contents in the DAP 30.

At this time, the user specifies the unit OPS3 using the mode selector 16 in the AV apparatus 20. Since the unit OPS3 is connected at the third stage counted from the AV apparatus 20, for example, the user specifies an identification number "3" using the mode selector. The specified identification number is called a specified ID.

The microcomputer M0 in the AV apparatus 20 determines that the mode selector 16 switches the identification number so as to specify the identification number "3" (YES at S101). At this time, the microcomputer M0 executes a control preparation process 5500. In the control preparation process 5500, a process (S104) for supplying the power to the unit OPS3 to be controlled, a process (S103 or S108) for acknowledging the object to be controlled to the unit OPS3 to be controlled, and a process (S122) for starting the control according to the type of the unit OPS3 after checking the activation of the unit OPS3 to be controlled (S109) are executed.

In the control preparation process 5500, the microcomputer M0 first checks if the operation flag is ON or OFF (S102). When the operation flag is on, at least one unit OPSn selected from one or plural unit(s) OPSn connected in the daisy chain receives the supply of the power and is operating. On the other hand, the operation flag is off, all the units OPSn connected in the daisy chain do not receive the supply of the power and is suspending.

As shown in FIG. 5, since the operations of the units OPS1 and OPS2 suspend in this example, the power is not supplied to the newly connected unit OPS3. For this reason, since the power is not supplied to all the units OPS1 to OPS3, the operation flag is "OFF" (YES at S102).

When the power is not supplied to all the units OPS1 to OPS3, the AV apparatus 10 should supply the power to the unit OPS3 to be controlled, and the units OPS1 and OPS2 connected to the former stage of the unit OPS3. This is because if the power is not supplied to the units OPS1 and OPS2 on the former stage of the unit OPS3, the connecting destination of the function switch 25 cannot be set to the through side signal line group 2000.

In order that the units OPS1 to OPS3 receive the supply of the power, each of the units OPSn should determine whether each of the units OPSn itself is the object to be controlled or is connected to the former stage of the unit OPSn to be controlled. In order to make the determination, each unit OPSn should recognize its self identification number and the identification number of the unit OPSn to be controlled.

When the identification numbers of the respective units OPSn are set as the numbers specific to the units, namely, the identification numbers are static numbers specific to the respective units, the management of the identification numbers in the AV apparatus 20 becomes complicated. In this case, if the user does not input the identification number specific to a new unit OPSn into the AV apparatus 20 in advance every time of purchasing the new unit OPSn, the AV apparatus 20 cannot recognize this unit.

In the second embodiment, therefore, the identification numbers of the respective units OPSn are made to be dynamic. Concretely, the identification numbers are given to the units OPSn in order where they are connected in the daisy chain to the AV apparatus 20. With such a method for giving the identification numbers, each of the units OPSn can determine whether the unit itself is the object to be controlled and whether the unit itself is connected to the former stage of the unit OPSn to be controlled.

With reference to FIG. 12, when the operation flag is off (YES at S102), the supply of the power is interrupted by the interruption circuit 12. Therefore, the microcomputer M0 turns on the interruption circuit 12 so as to cancel the interruption of the power supply (S104). With this operation, the power is supplied to the unit OPS1 via the power supply line L100. Thereafter, the microcomputer M0 activates the reset signal on the reset signal line L200 into the H level (S105).

With reference to FIGS. 13A and 13B, the microcomputer MS1 in the unit OPS1 receives the supply of the power and a reset signal of H level so as to cancel the reset and activate the unit OPS1 (S201). Before the activation of the unit OPS1 itself is completed, the reset signal on the reset signal line L202 is maintained in the L level so that the unit OPS2 adjacent on the rear is not activated (S202). The microcomputer MS1 then enables the communication using the I2C bus (S204). At this time, the microcomputer MS1 sets the self identification number (slave address) to a default value (for example "0"). The default value is stored in the memory (for example, ROM), not shown, in advance.

Further, the microcomputer MS1 registers a current mode flag representing the state of the self unit OPS1 in the memory (S230). The state of the unit OPSn includes "the controlled object mode", "the through mode" and "the default mode". "The controlled object mode" means that the self unit OPS1 is the object to be controlled. "The through mode" means that the unit OPSn adjacent on the rear is the object to be controlled. "The default mode" means that the unit OPSn has just been activated, and is the initial state where both the controlled object mode and the through mode are not set. The current mode is "1" in the controlled object mode, the current mode is "2" in the through mode, and the current mode is "0" in the default mode. Since the unit OPSn is in the initial state at step S230, the current mode flag "0" is registered in the memory.

Thereafter, the microcomputer MS1 monitors reception of acknowledgment of allocated ID. The acknowledgment of the allocated ID includes the identification number of the option OPS1 (namely, the number representing the position where the option OPS1 is connected to the AV apparatus 20). After predetermined time passes after step S105 (after time longer than the time required for the microcomputer MS1 to execute steps S201 to S204 passes), the microcomputer M0 in the AV apparatus 20 outputs the acknowledgment of allocated ID (ID="1") to an identification number of the default value (S106). The acknowledgment of allocated ID is output to the I2C bus L800. The microcomputer MS1 receives the acknowledgment of allocated ID from the I2C bus L801 (YES at S205), and stores the acknowledged ID "1" as the self identification number (hereinafter, the self ID) into the memory, not shown (S206).

Thereafter, the microcomputer MS1 inquires about a specified ID as the identification number of the unit OPS3 to be controlled (S207). Concretely, the microcomputer MS1 outputs a request of the specified ID to the AV apparatus 10 via the I2C bus L800.

After the acknowledgment of allocated ID is output (S106), the microcomputer M0 monitors the reception of the specified ID request (S107). When receiving the specified ID request (YES at S107), the microcomputer M0 outputs the acknowledgment of specified ID to all the units OPSn whose I2C buses are enabled (S108). The acknowledgment of specified ID includes the specified ID "3" specified by the mode selector 16. After the acknowledgement of specified ID is output, the microcomputer M0 monitors the reception of the acknowledgment of activation completion (S109). When the unit OPSn to be controlled is activated and the setting into the controlled object mode is completed, the acknowledgment of the activation completion is output from the unit OPSn to be controlled. In short, the AV apparatus 20 stands by until the unit OPSn to be controlled is activated.

The microcomputer MS1 of the unit OPS1 outputs the request of the specification ID (S207), and then monitors the reception of the acknowledgment of the specified ID (S208). The microcomputer MS1 determines whether the specified ID is registered, when it is registered, the microcomputer MS1 determines whether the specified ID registered in the memory is different from the specified ID in the acknowledgment of specified ID received at step S208 (S209). In this example, since the specified ID is not registered in the memory (YES at S209), the microcomputer MS1 stores the specified ID into the memory (S210).

With the above operation, the microcomputer MS1 stores the self ID and the specified ID in the memory, and can recognize them. The microcomputer MS1 therefore compares the self ID with the specified ID so as to make a determination (S211 and S218). The microcomputer MS1 executes the following process according to the determined result.

[In the Case of Self ID=Specified ID]

When the self ID is identical to the specified ID, the microcomputer MS1 determines that the microcomputer MS1 is the object to be controlled, and thus the specified mode is set to "1" representing the object to be controlled (S231). Thereafter, the microcomputer MS1 determines whether the current mode flag is the same as the specifying mode (S232). When the current mode flag is the same as the specifying mode (YES at S232), the unit OPS1 is already in the controlled object mode. For this reason, the process for setting into the controlled object mode (the controlled object mode setting process: S600) is not executed, and the sequence returns to step S208.

On the other hand, when the current mode flag is different from the specified mode (NO at S232), the controlled object mode setting process is executed (S600).

[In the Case where the Self ID<the Specified ID]

When the specified ID is larger than the self ID (NO at S211, YES at S218), the microcomputer MS1 determines that the unit OPSn to be controlled (namely, the unit specified at S101) is the unit on the subsequent stage. In this case, the microcomputer MS1 sets the specified mode to "2" representing the through mode (S235). Thereafter, the microcomputer MS1 determines whether the current mode flag is the same as the specified mode (S236). When the current mode is the same as the specified mode (YES at S236), the unit OPS1 is already in the through mode. For this reason, the microcomputer MS1 returns to step S208 without executing the process for setting the microcomputer MS1 itself into the through mode (the through mode setting process: S700).

On the other hand, when the current mode flag is different from the specified mode (NO at S236), the through mode process is executed (S700).

[In the Case where the Self ID>the Specified ID]

When the specified ID is smaller than the self ID (NO at S211, NO at S218), the unit on the former stage of the self unit is specified as the object to be controlled. In this case, the microcomputer MS1 returns to step S208. In the AV system 2, the power is supplied to the unit OPSn to be controlled and the unit on the former stage of the unit OPSn to be controlled, but the supply of the power to the units on the subsequent step of the unit OPSn to be controlled is interrupted. For this reason, when the specified ID is larger than the self ID, the microcomputer MS1 does not have to set the mode of the self unit (the controlled object mode or the through mode). This is because the operation suspends at some future time.

In this example, the determination is made that the specified ID is larger than the self ID (NO at S211, YES at S218). For this reason, the microcomputer MS1 sets the specified mode to "2" (S235). Further, a determination is made that the current mode flag is different from the specified mode at step S232 (NO at S236). Therefore, the microcomputer MS1 executes the through mode setting process (S700).

In the through mode setting process, the microcomputer MS1 first sets the latching relay 26 to the through side (S220). Concretely, the contacts P261 and P263 are connected. As a result, the connection detecting line L300 is connected to the connection detecting line L302. The connecting destination of the function unit 25 is set to the through side signal line group 2000 (S221). With this operation, the unit OPS1 is in the through mode state. For this reason, the power is supplied to the unit OPS2 adjacent on the rear to the unit OPS1. The microcomputer MS1 then activates the reset signal into the H level (S223).

With the above operation, the power and the reset signal of the H level are supplied to the unit OPS2. For this reason, the microcomputer MS2 in the unit OPS2 cancels the reset so as to be activated (S201), and enables the communication using the I2C bus (S204). At this time, the microcomputer MS2 sets the self ID to the default value "0". The microcomputer MS2 sets the current mode flag to the initial value "0" (S230).

After the microcomputer MS1 sets the reset signal to the H level at step S223, after predetermine period passed (YES at S224), it transmits the acknowledgment of the allocated ID to the default ID "0" via the I2C bus (S225). At this time, the microcomputer MS1 outputs the acknowledgment of the allocated ID including a value obtained by incrementing the self ID, namely, ID "2" (=1+1) (S225). In short, when the unit OPSn+1 adjacent on the rear is not activated, the unit OPSn gives the identification number ID obtained by incrementing the self ID to the unit OPSn+1 adjacent on the rear. With such an operation, the numbers are given to the units OPSn of the AV system 2 in order of connection to the AV apparatus 20. The predetermined period at S224 is not less than the time required for completing the operation at steps S201 to S204 by the microcomputer MS2.

After the allocated ID is acknowledged (S225), the microcomputer MS1 updates the current mode flag stored in the memory to "2". As a result, the microcomputer MS1 can recognize that the self unit is currently in the through mode.

The microcomputer MS2 receives the acknowledgment of the allocated ID at step S204 (YES at S204), and registers the self ID "2" in the memory (S206). The microcomputer MS2 outputs the request of the specified ID via the I2C buses L800 and L801 (S207). At this time, the microcomputer M0 of the AV apparatus 20 repeatedly performs the operation at steps S107 to S109. For this reason, the microcomputer M0 receives the request of the specified ID at step S107, and outputs the acknowledgment of the specified IDs including the specified ID "3" to the units OPS1 and OPS2 whose I2C bus communication is valid.

The microcomputer MS2 receives the specified IDs and registers them (YES at S209, S210). The microcomputer MS2 compares the self ID with the specified IDs (S211 and S218). Since the specified ID "3" is larger than the self ID "2" (NO at S211, YES at S218), the microcomputer MS2 sets the specified mode to "2" (S235), and compares it with the current mode flag (S236). As a result of the comparison, since the current mode flag is different from the specified mode (NO at S236), the microcomputer MS2 executes the through mode setting process (S700). On the other hand, the microcomputer MS1 also receives the specified ID (YES at S208). However, the microcomputer MS1 determines at step S209 that the specified ID received at step S208 is the same as the specified ID stored in the memory (NO at S209). For this reason, the sequence returns to step S208. That is to say, since the setting is not changed, the microcomputer MS1 again monitors the reception of the specified ID without executing the through mode setting process (S208).

According to the through mode setting process in the microcomputer MS2 (S700), the microcomputer MS3 in the unit OPS3 cancels the reset so as to be activated (S201). The microcomputer MS3 sets the self ID to the default value (S204), and sets the current mode to "0" (S230). The microcomputer MS3 acquires the allocated ID from the microcomputer MS2 (YES at S205). The microcomputer MS2 outputs the allocated ID "3" (=self ID+1) to the microcomputer MS3 in the through mode setting process (S700). For this reason, the microcomputer MS3 registers the self ID "3" in the memory (S206).

The microcomputer MS3 acquires the specified ID similarly to the microcomputers MS1 and MS2 (S207 and S208). The microcomputer MS3 registers the specified ID in the memory (S210). The microcomputer MS3 compares the self ID with the specified ID similarly to the microcomputers MS1 and MS2.

In this example, since the identification ID is 3, the microcomputer MS3 determines that the self ID is identical to the specified ID (YES at S211). Therefore, the microcomputer MS3 sets the specified mode to "1" (S231), and compares it with the current mode flag (S232). In this example, since the current mode flag is different from the specified mode (NO at S232), the microcomputer MS3 executes the controlled object mode setting process (S600).

In the controlled object mode setting process, the microcomputer MS3 first sets the reset signal on the reset signal line L202 to the L level (S213). In this example, since the reset signal is already in the L level at step S202, the reset signal is maintained in the L level at step S213. As a result, if the unit OPS4 is connected to the subsequent stage of the unit OPS3, the power to the unit OPS4 is interrupted and the operation is suspended.

The microcomputer MS3 then sets the connected state of the latching relay 26 to the self side (S214). Concretely, the microcomputer MS3 outputs a signal so as to connect the contacts P261 and P262. As a result, the connection detecting lines L300 and L302 are connected. The microcomputer MS3 further sets the connecting destination of the function switch 25 to the self side signal line group 1000 (S215). As a result, the power is supplied to the contents signal generating unit 30, and the controlled object mode is completed.

After the above operation is performed, the microcomputer MS3 outputs the acknowledgment of the activation completion to the I2C bus L801 (S217). After the above operation is completed, the microcomputer MS3 updates the current mode flag to "1". As a result, the microcomputer MS3 can recognize that the microcomputer MS3 itself is currently in the controlled object mode.

The microcomputer M0 of the AV apparatus 10 repeats the operation at steps S107 to S109, but when receiving the acknowledgment of the activation completion from the microcomputer MS3 at step S109, the microcomputer M0 executes a control method determining process of the unit OPS3 (S110 to S116).

In the control method determining process, the microcomputer MS3 first checks the voltage level of the connection detecting line L300. Even if the unit OPS3 is the detachable type unit OPS3A, the contents signal generating unit 30 is attached, the voltage level is in the L level. For this reason, the microcomputer M0 turns on the operation flag (S111), and stores it in the memory. Hereinafter, it is found that any one of the units OPS1 to OPS3 connected in the daisy chain is operating by seeing the operation flag.

Thereafter, the microcomputer M0 outputs the request of the type information to the ID "3" via the I2C bus L800. The units OPS1 to OPS3 check a transmission destination address of the request of the type information, and when the address is different from the self ID, they ignore the address. The microcomputer MS3 of the unit OPS3 determines that the transmission destination address of the type information request is identical to the self ID, and transmits the self type information to the microcomputer M0. The self type information is stored together with the default value of the slave address into a memory (ROM or the like) of the unit OPS3.

The microcomputer M0 receives the type information (YES at S113), and reads a control command according to the type information from the memory. The microcomputer M0 transmits a control command selected by a user's operation to the unit OPS3. In short, the microcomputer M0 makes the control according to the type information (S114).

On the other hand, when the unit OPS3 is a detachable type unit OPS3A and the contents signal generating unit 30 is not attached to the connector 28, the connection detecting line L300 is in the H level (NO at S110). In this case, since the operable unit OPSn to be controlled is not present, the microcomputer M0 maintains the operation flag in an OFF state (S115) so as to interrupt the supply of the power (S116).

[Case 2]

The case where the unit OPS3 in FIG. 5 is the detachable type unit OPS3A and is operating as the object to be controlled is assumed. When the contents apparatus 30 is removed from the connector 28, the AV apparatus 10 suspends the supply of the power to the units OPS1 to OPS3, so that the power consumption can be reduced.

When the user removes the contents apparatus 30 (for example, DAP or the like) from the connector 28 of the unit OPS3A, the conducting line L302 is disconnected from the ground terminal GND of the contents signal generating unit 30. At this time, the voltage level of the connection detecting line L300 is in the H level.

The microcomputer M0 of the AV apparatus 10 determines that the connection detecting line L300 is changed from the L level into the H level (NO at S101, YES at S117, NO at S118). For this reason, the microcomputer M0 interrupts the supply of the power using the interruption circuit 12 (S119). The microcomputer M0 turns off the operation flag (S120). With these steps, the supply of the power to the units OPS1 OPS2 and OPS3A is interrupted, and the operation suspends. For this reason, the power consumption can be reduced.

Even if the supply of the power is suspended, the latching relays 26 of the units OPS1 and OPS2 are maintained in the connected state "through mode", and the latching relay 26 of the unit OPS3A is maintained in the connected state "controlled object mode".

When the contents apparatus 30 is again connected to the connector 28, the microcomputer M0 determines that the connection detecting line L300 is changed from the H level into the L level (NO at S101, YES at S117, YES at S118). For this reason, the sequence goes to S104, and the similar operation to that in the case 1 is performed. That is to say, the units OPS1 to OPS3 are sequentially activated, and the unit OPS3 is controlled.

With the above operation, even when the power is not supplied to all the units OPS1 to OPS3, the latching relays 26 of the units OPS1 to OPS3 are maintained in the connected state. For this reason, the attachment of the contents signal generating unit 30 can be detected on the connection detecting line L300, and the unit OPS3 to be controlled can be again controlled.

[Case 3]

As shown in FIG. 6, the operation of the AV system 2 in the case where the unit to be used by the user is changed from the OPS3 into the unit OPS2 is described.

In this case, the user changes the specified ID from "3" into "2" using the mode selector 16. At this time, the microcomputer M0 detects the switching of the specified ID (YES at S101), and checks the operation flag stored in the memory (S102). In FIG. 6, since the operation flag is ON (NO at S102), the supply of the power is not interrupted. Therefore, the microcomputer M0 transmits the acknowledgement of the specified ID including the specified ID "2" via the I2C bus L800 (S103).

With reference to FIGS. 13A and 13B, the units OPS1 to OPS3 monitor the reception of the acknowledgment of the specified ID during the operation (S208). The units OPS1 to OPS3 receive the acknowledgment of the specified ID so as to perform the following operation based on step S103.

[Unit OPS1]

The microcomputer MS1 of the unit OPS1 receives the specified ID "2" at step S208 (YES at S208). In FIG. 6, since the specified ID "3" is stored in the memory of the unit OPS1 (NO at S209), the microcomputer MS1 updates the specified ID in the memory from "3" into "2" (S210).

Thereafter, the microcomputer MS1 compares the self ID with the updated specified ID. As a result, the microcomputer MS1 determines that the specified ID is larger than the self ID (NO at S211, YES at S218). At this time, the specified mode is set as "2" (S235), and the microcomputer MS1 determines whether the current mode flag is identical to the specified mode (S236). In this example, since the unit OPS1 is in the through mode, the current mode is "2". Therefore, since the current mode is the same as the specified mode (YES at S236), the microcomputer MS1 returns to step S208 without executing the through mode process.

[Unit OPS2]

The microcomputer MS2 of the unit OPS2 receives the specified ID "2" at step S208 (YES at S208), and updates the specified ID in the memory to "2" (YES at S209, S210). The microcomputer MS2 determines that the self ID is identical to the specified ID (YES at S211). Therefore, the microcomputer MS2 sets the specified mode to "1" (S231), and determines whether the current mode flag is the same as the specified mode (S232). In this example, since the unit OPS2 is in the through mode, the current mode flag shows "2". Therefore, the microcomputer MS2 determines that the current mode flag is different from the specified mode flag (YES at S232), and executes the controlled object mode setting process (S600). The supply of the power to the unit OPS3 is interrupted by the execution of the controlled object mode setting process, and the reset signal to be output to the unit OPS3 is in the L level. For this reason, the operation of the unit OPS3 suspends.

With this operation, the switching of the specified ID is completed. The microcomputer M0 in the AV apparatus 20 receives the acknowledgment of the activation completion output from the unit OPS2 (YES at S109), and executes the control method determining process (S110 to S116). For this reason, the control according to the type of the unit OPS2 can be made.

Third Embodiment

Figure 14:
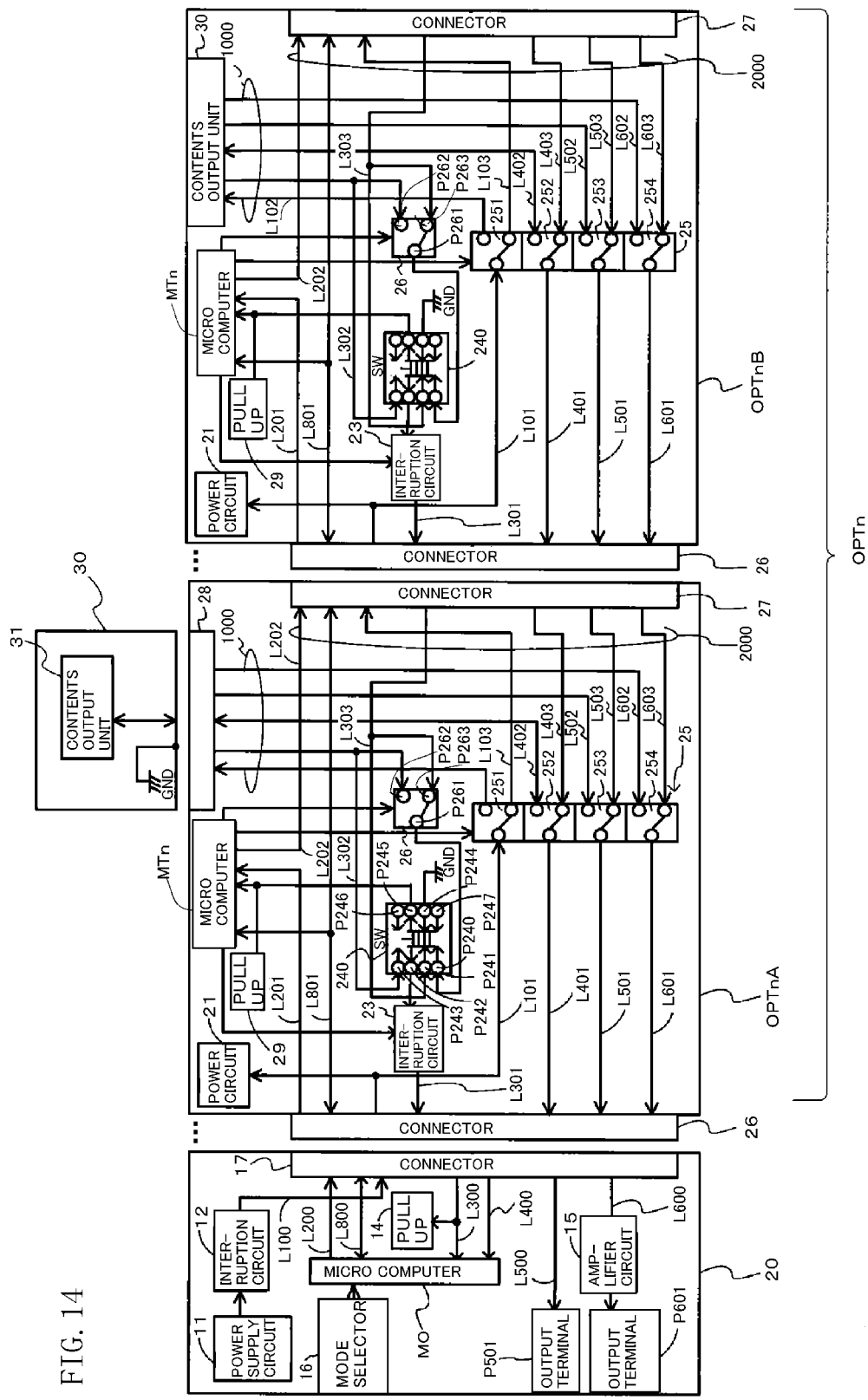
FIG. 14 is a functional block diagram illustrating constitutions of the AV apparatus and the option units composing the AV system according to a third embodiment.

The option unit may include both the slide switching and the latching relay. With reference to FIG. 14, an AV system 3 in the third embodiment has the AV apparatus 20, and a plurality of units OPT1 to OPTn. They are connected in the daisy chain similarly to FIG. 10.

The constitution of the AV apparatus 20 is as described in the second embodiment. The constitution of the units OPTn is described below.

[Option Unit]

In comparison with the units OPSn shown in FIG. 11, the units OPTn further have the interruption circuit 23, a slide switch 240, and a pull-up circuit 29. The interruption circuit 23 has the same configuration as that of the interruption circuit 23 in the units OPFn shown in FIG. 3, and is connected between the slide switch 240 and the input/output terminal in the connector 26 connected to the connection detecting line L300.

The slide switch 240 is a mechanical switch similarly to the slide switch 24 shown in FIG. 3. The slide switch 240 has the contacts P241 to P246, and contacts P240 and P247. The connected relationship among the contacts P241 to P246 is the same as that in the slide switch 24 shown in FIG. 3. The contact P240 is connected to the latching relay 26. The contact 247 is an open end.

The contact P261 in the latching relay 26 is connected to the contact P240. The contact P262 is connected to the conducting line L302, and the contact P263 is connected to the conducting line L303.

The slide switch 240 can select one of three modes. The three modes include the through mode, the controlled object mode and the remote mode.

When the operating piece SW is moved to an upper stage in FIG. 14, the slide switch 240 is set into the controlled object mode. In this case, the contacts P242 and P243 are connected. At this time, the connection detecting line L300 is connected to the conducting line L302. Further, the contacts P245 and P246 are connected. At this time, since one end (contact P246) of the switch detecting line L700 is opened, the voltage level is in the H level (high-impedance state).

When the operating piece SW is moved to a middle stage in FIG. 14, the slide switch 240 is set into the through mode. In this case, the contacts P241 and P242 are connected. As a result, the connection detecting line L300 is connected to the conducting line L303. Further, the contacts P244 and P245 are connected. In this case, the switch detecting line L700 is connected to the ground terminal GND. For this reason, the voltage level of the switch detecting line L700 is in the L level.

When the operating piece SW3 is moved to a lower stage, the slide switch 240 is set into the remote mode. In this case, the connection detecting line L300 is connected to the latching relay 26. Therefore, when the slide switch 240 is set into the remote mode, not the slide switch 240 but the latching relay 26 sets "the controlled object mode" or "the through mode". The other parts of the constitution are the same as those of the units OPSn shown in FIG. 11. As shown in FIG. 14, the option units OPTn include two kinds of a detachable type unit OPTnA and a fixed type unit OPTnB similarly to the units OPFn and OPSn which described above.

When the user manually operates the operating pieces SW of the units OPTn, the slide switch 240 can be set into "the through mode" and "the controlled object mode". In this case, the AV apparatus 20 performs the operation similar to that of the AV apparatus 10 (FIGS. 7 and 9). Further, the units OPTn perform the operation shown in FIG. 8.

On the other hand, when the slide switch 240 is set into "the remote mode" by the movement of the operating piece SW through the user, the AV apparatus 20 performs the operation shown in FIG. 12. The units OPTn perform the operation shown in FIGS. 13A and 13B.

In the above embodiments, the slide switches 24 and 240 are used as the mechanical switch. However, the slide switches 24 and 240 may be replaced by a toggle switch, a push switch, a locker switch, a rotary switch, a dip switch, a jumper switch and the like.

In the above embodiments, the reset signal lines L200, L201 and L202 are provided, and the reset signal lines are activated so that the unit adjacent on the rear is activated. However, when the power supply circuit 21 in each unit has a power-on reset signal circuit and it receives the power, an activated power-on reset signal may be output to the self microcomputer. In this case, the reset signal lines L200 to L202 are not necessary.

The embodiments of the present invention are described above, but the above embodiments are only examples for carrying out the present invention. Therefore, the present invention is not limited to the above embodiments, and the above embodiments can be suitably modified and carried out without departing from the scope of the gist.

What is claimed is:

1. An AV system in which a power feeding apparatus and a plurality of power receiving apparatuses are connected in a daisy chain with the power feeding apparatus in the lead, wherein
the power feeding apparatus includes:
a connection detecting line;
an applying unit that applies a voltage to the connection detecting line; and
a power supply unit that supplies a power to the power receiving apparatus or suspends the supply of the power according to a voltage level of the connection detecting line,
the power receiving apparatuses include:
a contents signal output unit that outputs a contents signal that carries content data of the AV system upon the supply of the power;
a ground terminal having a ground potential;
a conducting line that connects to another power receiving apparatus in the daisy chain; and
a first switch unit that switches the connection detecting line between the ground terminal of the power receiving apparatus and the conducting line that connects to the ground terminal in the another power receiving apparatus through the first switch unit in the another power receiving apparatus to change the voltage level of the connection detecting line, and that holds a connected state even when the power is not supplied.

2. The AV system according to claim 1, wherein the power receiving apparatuses further include a second switch unit that switches a supply destination of the power between the contents signal output unit and another power receiving apparatus in the daisy chain according to a connecting destination of the connection detecting line by the first switch unit.

3. The AV system according to claim 2, wherein
the power receiving apparatuses further include:
a switch detecting unit connected to the first switch unit in which a voltage level fluctuates according to the connecting destination of the connection detecting line,
the second switch unit switches the supply destination of the power according to the voltage level of the switch detecting unit.

4. The AV system according to claim 2, wherein
the power receiving apparatuses further include an interruption unit that, when the first switch unit switches the connecting destination of the connection detecting line, interrupts the connection between the connection detecting line and the first switch unit, after the second switch unit switches the supply destination of the power, cancels the interruption of the connection between the connection detecting line and the first switch unit,
the contents signal output unit further outputs type information about a type of the contents signal output unit according to a request from the power feeding apparatus when the power is supplied,
the power feeding apparatus further includes:
a request unit that requests the contents signal output unit to which the power is supplied to send the type information according to a change in the voltage level of the connection detecting line; and
a control unit that controls the contents signal output unit based on the type information.

5. The AV system according to claim 4, wherein when the voltage level of the connection detecting line is changed from an H level into an L level and even though a predetermined period longer than time required for the interruption unit to interrupt the connection between the connection detecting line and the first switch unit and to cancel the interruption passes, the voltage level is maintained in the L level, the power supply unit suspends the supply of the power.

6. The AV system according to claim 1, wherein
when the power is supplied to the power receiving apparatuses, the first switch unit switches a connecting destination of the connection detecting line according to an acknowledgment of specified ID output from the power feeding apparatus,
the power receiving apparatuses further include:
a second switch unit that switches a supply destination of the power between the contents signal output unit and another receiving apparatus in the daisy chain according to the acknowledgement of the specified ID,
the power feeding apparatus includes:
a specification receiving unit that accepts specification of a power receiving apparatus to be controlled in the plurality of power receiving apparatuses; and
a specification acknowledging unit that outputs the acknowledgement of the specified ID including an identification number of the specified power receiving apparatus to the power receiving apparatus.

7. The AV system according to claim 6, wherein
the power feeding apparatus further includes a first identification number acknowledging unit for acknowledging an identification number of the power receiving apparatus in the daisy chain when the power is supplied,
the power receiving apparatus further include:
a registering unit that registers the identification number acknowledged from the power feeding apparatus in the daisy chain as a self identification number; and
a second identification number acknowledging unit that creates the identification number of the power receiving apparatus in the daisy chain based on the self identification number so as to acknowledge the created identification number.

8. The AV system according to claim 7, wherein
the power receiving apparatuses further include a determining unit that determines whether the specified power receiving apparatus is itself or another receiving apparatus connected to a subsequent stage of the self apparatus based on the self identification number and the identification number included in the acknowledgment of the specified ID,
when the specified power receiving apparatus is the self apparatus, the first switch unit connects the connection detecting line to the ground terminal, and the second switch unit sets the contents signal output unit as the supply destination of the power, when the specified power receiving apparatus is another power receiving apparatus connected to the subsequent stage of the self apparatus, the first switch unit connects the connection detecting line to the conducting line and the second switch unit sets another power receiving apparatus in the daisy chain as the supply destination of the power, and the second identification number acknowledging unit acknowledges the identification number.

9. The AV system according to claim 8, wherein the power receiving apparatuses further include:
an activation completion acknowledging unit that, when the specified power receiving apparatus is the self apparatus, transmits an acknowledgment of activation completion after the operations of the first and second switch units are completed; and
a type information transmitting unit that transmits type information about a type of the contents signal output unit to the power feeding apparatus according to a request of the type information from the power feeding apparatus,
the power feeding apparatus further includes:
a type information request unit that requests the specified power receiving apparatus to transmit the type information according to the acknowledgment of the activation completion; and
a control unit that controls the contents signal output unit of the specified power receiving apparatus according to the transmitted type information.

10. A power feeding apparatus with which a plurality of power receiving apparatuses are capable of connecting in a daisy chain in a AV system, the power receiving apparatuses include:
a contents signal output unit that outputs a contents signal that carries content data of the AV system upon the supply of the power;
a ground terminal having a ground potential;
a conducting line that connects to another power receiving apparatus in the daisy chain; and
a first switch unit that holds a connected state even when the power is not supplied;
the power feeding apparatus includes:
a connection detecting line whose connection destination is switched by the first switch unit in the power receiving apparatus between the ground terminal of the power receiving apparatus and the conducting line that connects to the ground terminal in the another power receiving apparatus through the first switch unit in the another power receiving apparatus to change the voltage level of the connection detecting line;
an applying unit that applies a voltage to the connection detecting line; and
a power supply unit that supplies a power to the power receiving apparatus or suspends the supply of the power according to a voltage level of the connection detecting line.

11. The power feeding apparatus according to claim 10, wherein
the power receiving apparatuses further include;
a second switch unit that switches a supply destination of the power between the contents signal output unit and another power receiving apparatus in the daisy chain according to a connecting destination of the connection detecting line by the first switch unit, and
an interruption unit that, when the first switch unit switches the connecting destination of the connection detecting line, interrupts the connection between the connection detecting line and the first switch unit, after the second switch unit switches the supply destination of the power, cancels the interruption of the connection between the connection detecting line and the first switch unit,
the contents signal output unit further outputs type information about a type of the contents signal output unit according to a request from the power feeding apparatus when the power is supplied,
the power feeding apparatus further includes:
a request unit that requests the contents signal output unit to which the power is supplied to send the type information according to a change in the voltage level of the connection detecting line; and
a control unit that controls the contents signal output unit based on the type information.

12. The power feeding apparatus according to claim 10, wherein
when the power is supplied to the power receiving apparatuses, the first switch unit switches a connecting destination of the connection detecting line according to an acknowledgment of specified ID output from the power feeding apparatus,
the power receiving apparatuses further include:
a second switch unit that switches a supply destination of the power between the contents signal output unit and another receiving apparatus in the daisy chain according to the acknowledgement of the specified ID,
the power feeding apparatus includes:
a specification receiving unit that accepts specification of a power receiving apparatus to be controlled in the plurality of power receiving apparatuses; and
a specification acknowledging unit that outputs the acknowledgement of the specified ID including an identification number of the specified power receiving apparatus to the power receiving apparatus.

13. The power feeding apparatus according to claim 12, wherein
the power feeding apparatus further includes a first identification number acknowledging unit that acknowledges an identification number of the power receiving apparatus in the daisy chain when the power is supplied,
the power receiving apparatus further include:
a registering unit that registers the identification number acknowledged from the power feeding apparatus in the daisy chain as a self identification number; and
a second identification number acknowledging unit that creates the identification number of the power receiving apparatus in the daisy chain based on the self identification number so as to acknowledge the created identification number.

14. A power receiving apparatus connectable in a daisy chain with a power feeding apparatus in an AV system, the power feeding apparatus includes:
a connection detecting line; and
a power supply unit that supplies a power to the power receiving apparatus or suspends the supply of the power according to a voltage level of the connection detecting line,
the power receiving apparatus includes:
a contents signal output unit that outputs a contents signal that carries content data of the AV system upon the supply of the power;
a ground terminal having a ground potential;
a conducting line that connects to another power receiving apparatus in the daisy chain; and
a first switch unit that switches the connection detecting line between the ground terminal of the power receiving apparatus and the conducting line that connects to the ground terminal in the another power receiving apparatus through the first switch unit in the another power receiving apparatus to change the voltage level of the connection detecting line and that holds a connected state even when the power is not supplied.

15. The power receiving apparatus according to claim 14, further including a second switch unit that switches a supply destination of the power between the contents signal output unit and another power receiving apparatus in the daisy chain according to a connecting destination of the connection detecting line by the first switch unit.

16. The power receiving apparatus according to claim 15, further including a switch detecting unit connected to the first switch unit in which a voltage level fluctuates according to the connecting destination of the connection detecting line, wherein
the second switch unit switches the supply destination of the power according to the voltage level of the switch detecting unit.

17. The power receiving apparatus according to claim 15, further including an interruption unit that, when the first switch unit switches the connecting destination of the connection detecting line, interrupts the connection between the connection detecting line and the first switch unit, after the second switch unit switches the supply destination of the power, cancels the interruption of the connection between the connection detecting line and the first switch unit, wherein
the contents signal output unit further outputs type information about a type of the contents signal output unit according to a request from the power feeding apparatus when the power is supplied,
the power feeding apparatus further includes:
a request unit that requests the contents signal output unit to which the power is supplied to send the type information according to a change in the voltage level of the connection detecting line; and
a control unit that controls the contents signal output unit based on the type information.

18. The power receiving apparatus according to claim 14, wherein
when the power is supplied to the power receiving apparatuses, the first switch unit switches a connecting destination of the connection detecting line according to an acknowledgment of specified ID output from the power feeding apparatus,
the power receiving apparatus further includes:
a second switch unit that switches a supply destination of the power between the contents signal output unit and another receiving apparatus in the daisy chain according to the acknowledgement of the specified ID,
the power feeding apparatus includes:
a specification receiving unit that accepts specification of a power receiving apparatus to be controlled in the plurality of power receiving apparatuses; and
a specification acknowledging unit that outputs the acknowledgement of the specified ID including an identification number of the specified power receiving apparatus to the power receiving apparatus.

19. The power receiving apparatus according to claim 18, wherein
the power feeding apparatus further includes a first identification number acknowledging unit for acknowledging an identification number of the power receiving apparatus in the daisy chain when the power is supplied,
the power receiving apparatus further include:
a registering unit that registers the identification number acknowledged from the power feeding apparatus in the daisy chain as a self identification number; and
a second identification number acknowledging unit that creates the identification number of the power receiving apparatus in the daisy chain based on the self identification number so as to acknowledge the created identification number.

20. A power receiving apparatus connectable in a daisy chain with a power feeding apparatus in an AV system, the power feeding apparatus includes:
a connection detecting line; and
a power supply unit that supplies a power to the power receiving apparatus or suspends the supply of the power according to a voltage level of the connection detecting line,
the power receiving apparatus includes:
a connector where a contents apparatus including a ground terminal having a ground potential and a contents signal output unit that outputs a contents signal that carries content data of the AV system upon the supply of the power is detachable;
a conducting line that connects to another power receiving apparatus in the daisy chain; and
a first switch unit that switches the connection detecting line between the ground terminal of the power receiving apparatus and the conducting line that connects to the ground terminal in the another power receiving apparatus through the first switch unit in the another power receiving apparatus to change the voltage level of the connection detecting line and that holds a connected state even when the power is not supplied.

\* \* \* \* \*